June 1, 1965  K. J. STALLER  3,186,639
MECHANICALLY VARIABLE ELEMENTS TO
CALCULATE CHECK SYMBOLS
Filed April 13, 1961  8 Sheets-Sheet 1
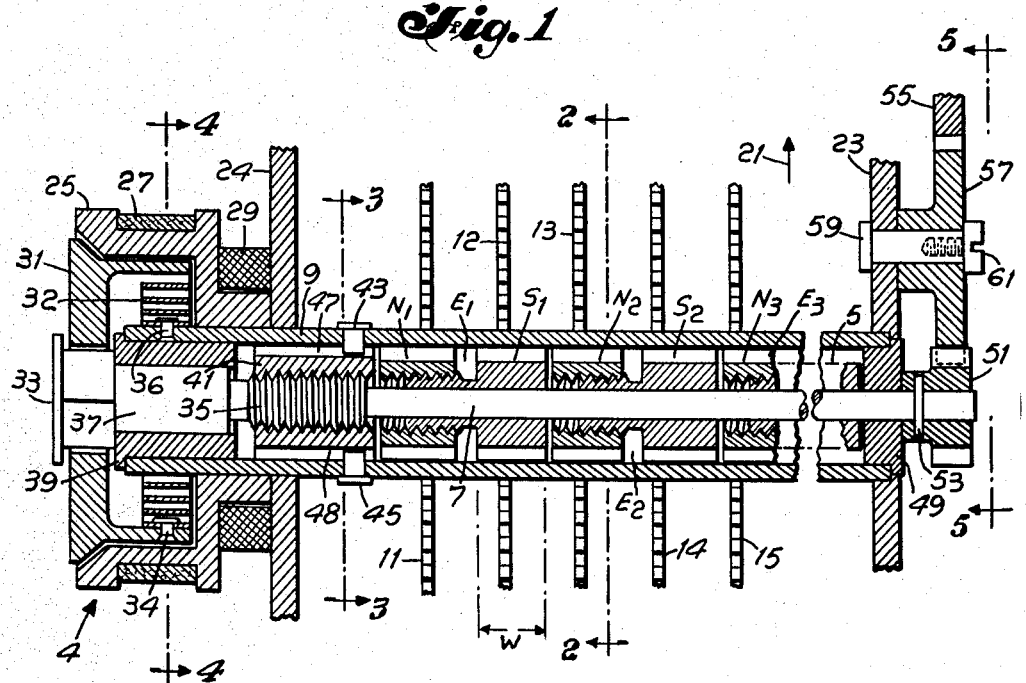
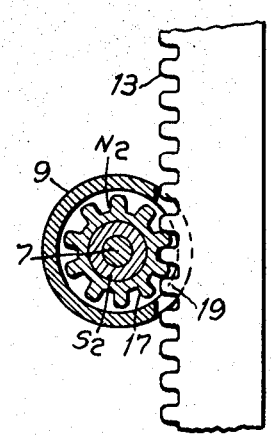
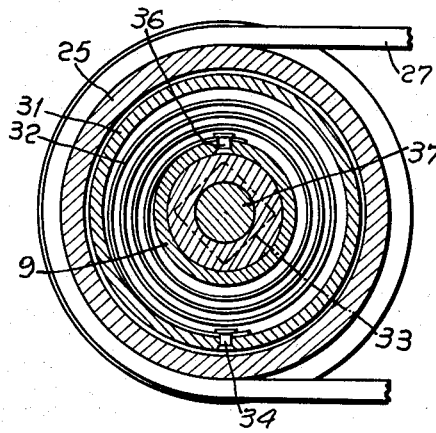
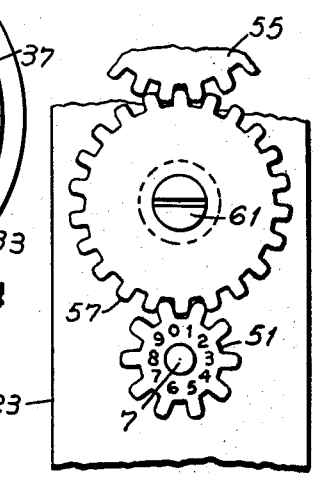
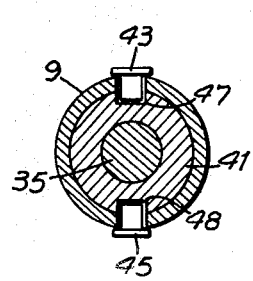
INVENTOR.
KAREL J. STALLER
BY Robert Lieber
ATTORNEY

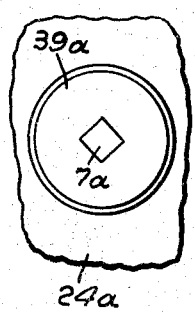
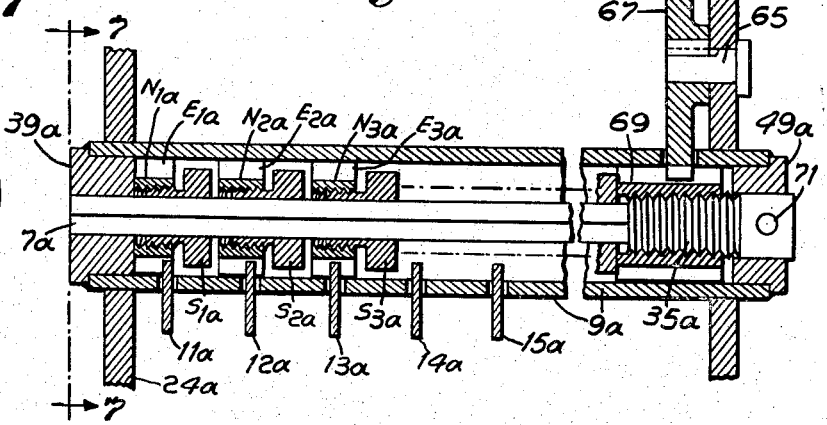
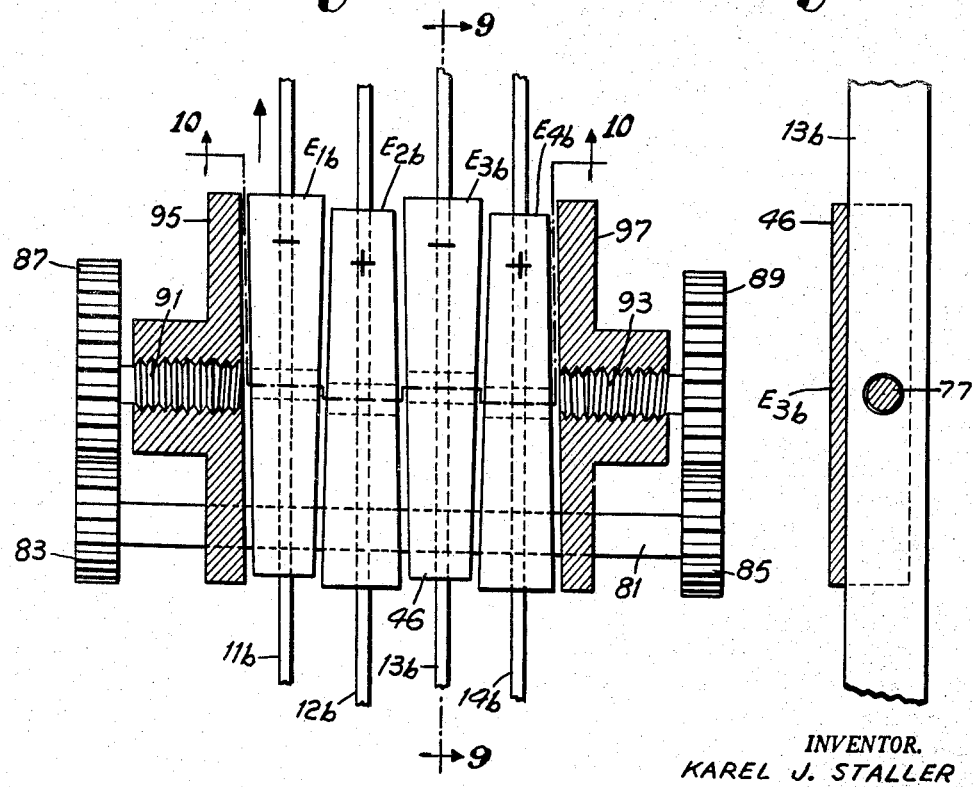

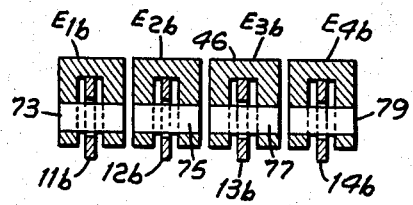
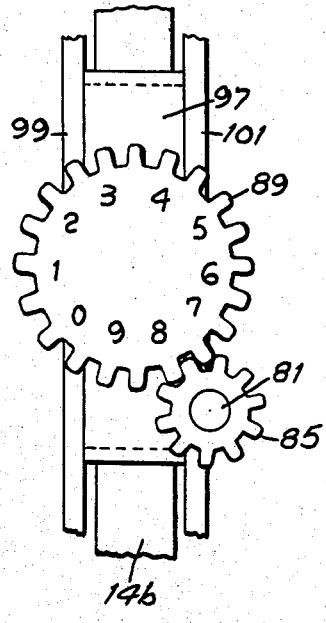
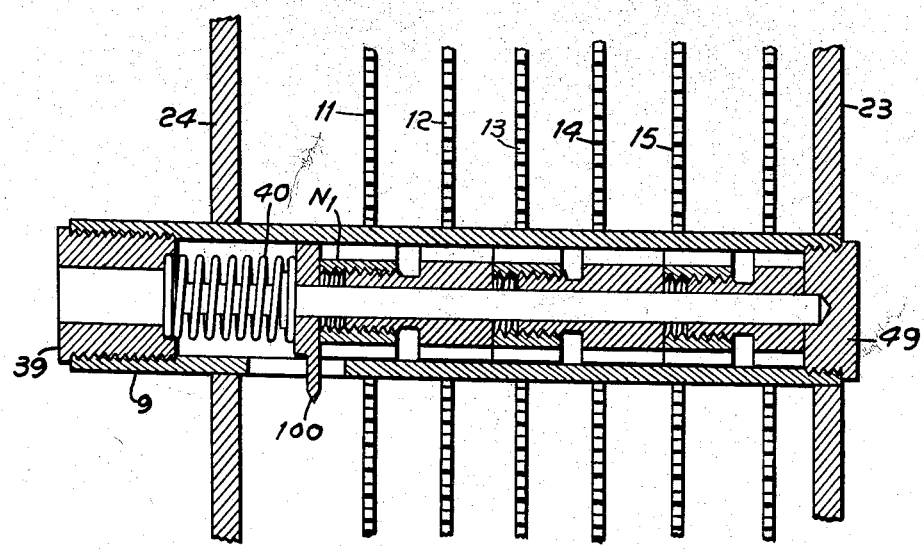

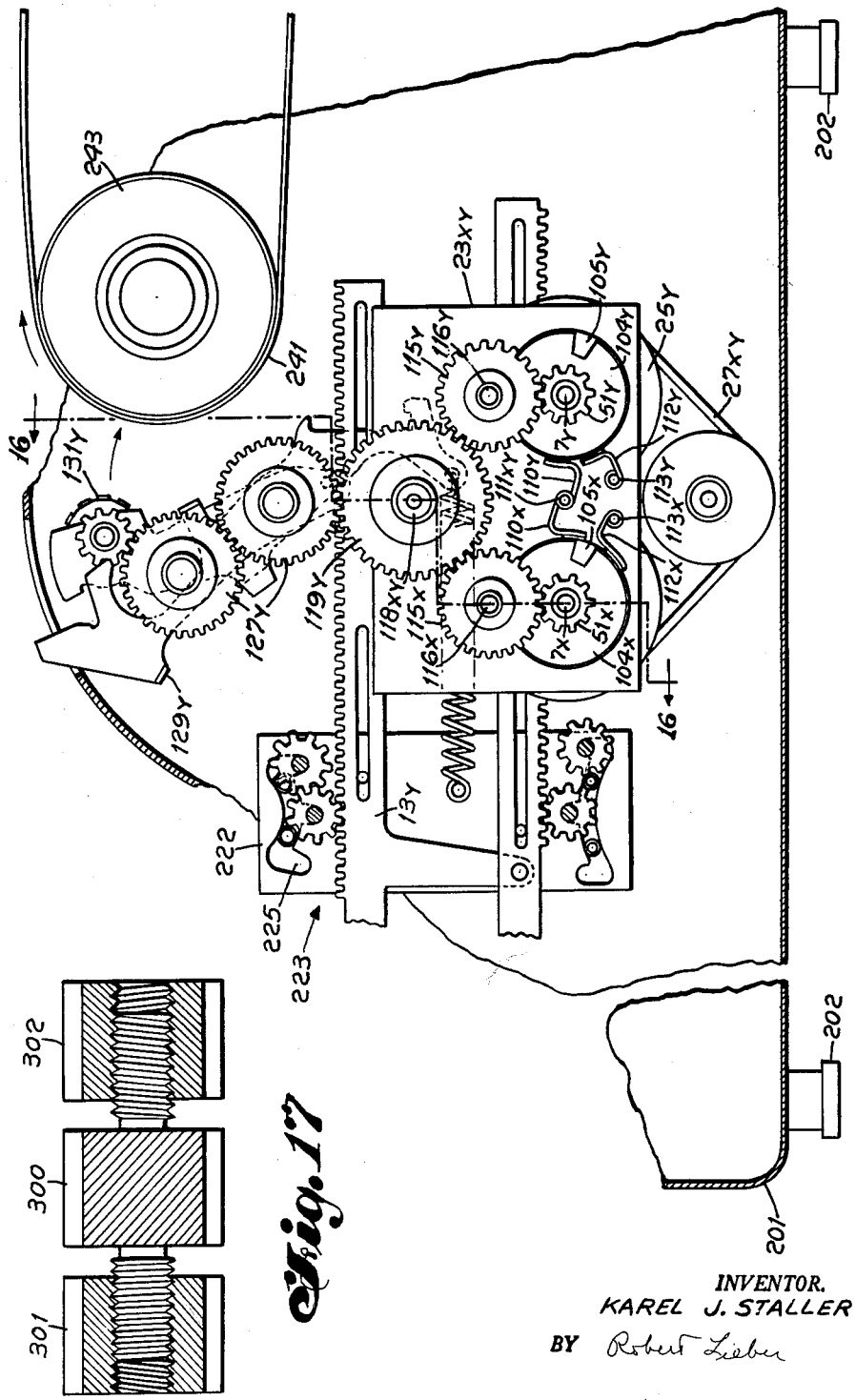

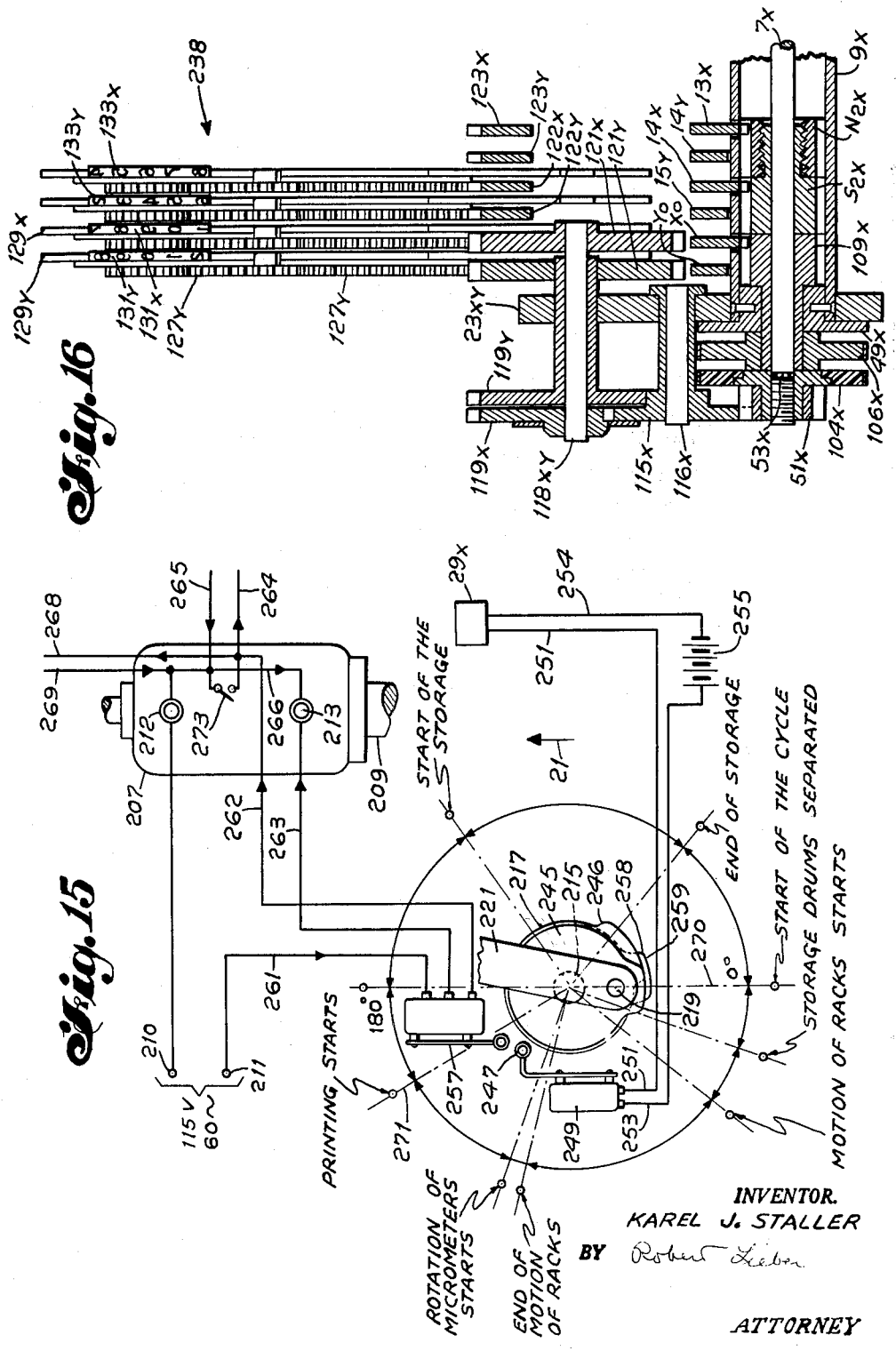

June 1, 1965  K. J. STALLER  3,186,639
MECHANICALLY VARIABLE ELEMENTS TO
CALCULATE CHECK SYMBOLS
Filed April 13, 1961  8 Sheets-Sheet 7
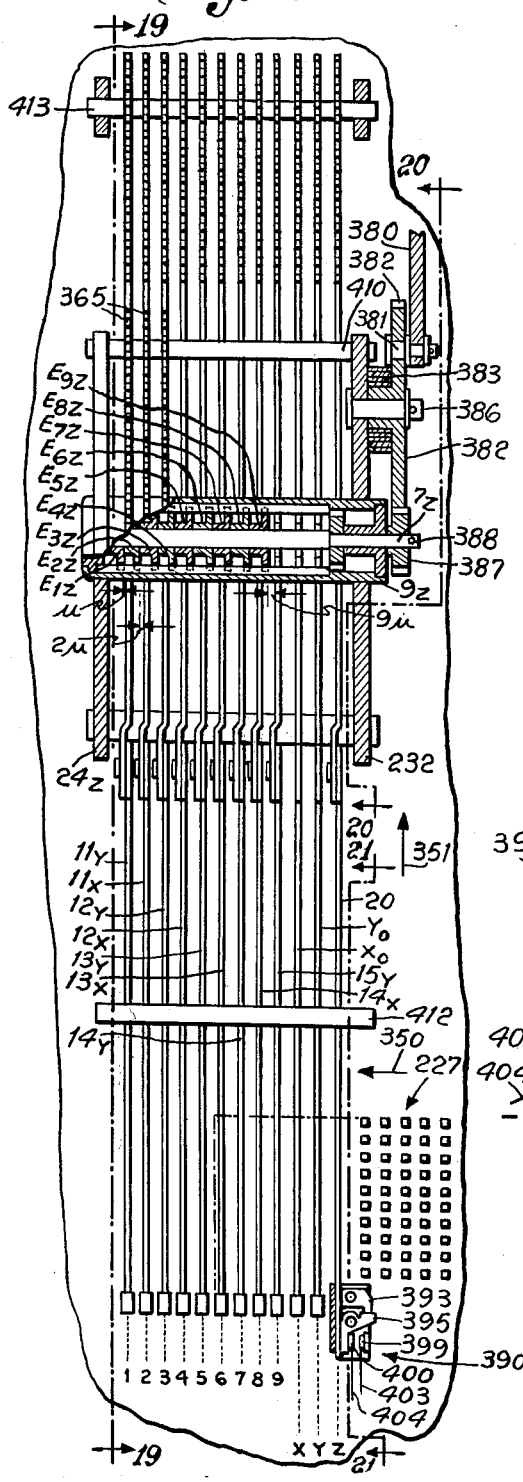
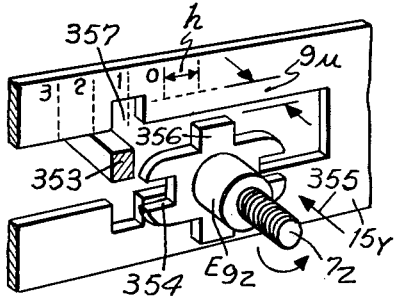
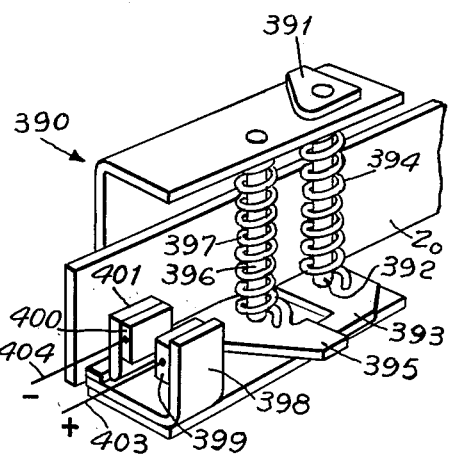
INVENTOR.
KAREL J. STALLER
BY Robert Lieber
ATTORNEY

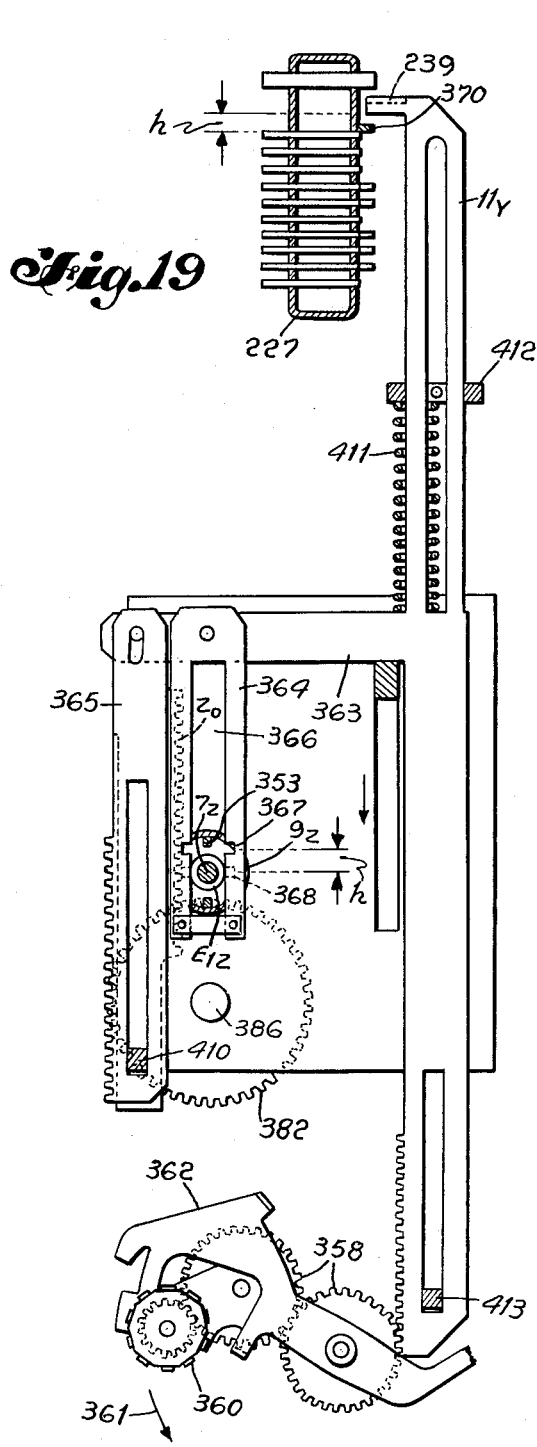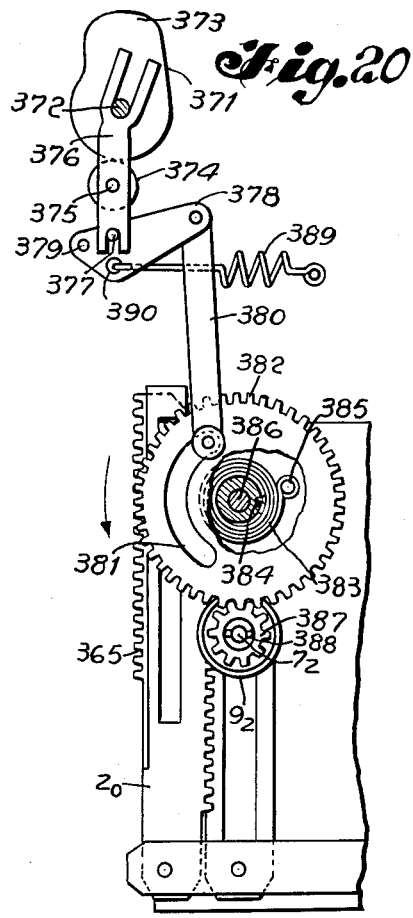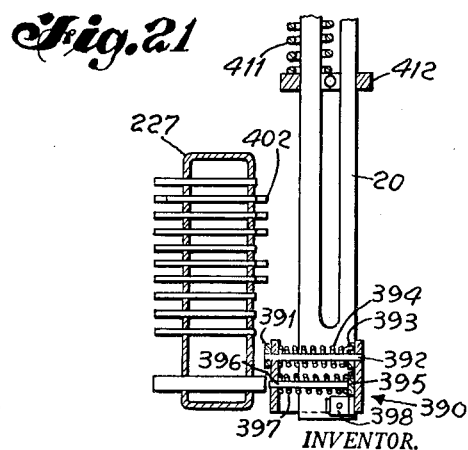

United States Patent Office 3,186,639
Patented June 1, 1965

3,186,639
MECHANICALLY VARIABLE ELEMENTS TO
CALCULATE CHECK SYMBOLS
Karel J. Staller, Rutherford, N.J., assignor to International
Telephone and Telegraph Corporation, Nutley, N.J.,
a corporation of Maryland
Filed Apr. 13, 1961, Ser. No. 102,692
35 Claims. (Cl. 235—60)

This invention relates generally to devices dependent upon a plurality of independently determined mechanical effects. Devices of this general nature may be employed in a variety of applications—in analog computing machines for generating functions of several variables, in coin operated devices, in devices for calculating a check symbol to be used to verify the accuracy of, or to control the transfer of, a digitally represented quantity, and so on—the common characteristic being the direct derivation of a single mechanical effect which is functionally related to the independently determined plurality of mechanical effects.

The independently determined effects in question may assume many different forms, depending upon the particular applications involved—for example, they may be size variations, length variations, position variations, or the like—and the derived effect may similarly be mainifested in a variety of states. The principal distinguishing characteristics of the present invention, in contrast to generically similar devices, relate to improvements, in terms of size, accuracy, simplicity and reliability, derived from the unique arrangement to be disclosed herein.

Accordingly, it is an object of this invention to provide a simple, compact, reliable, and accurate device for directly deriving a mechanical effect corresponding to a function of a plurality of independently determined mechanical effects.

Another object is to provide a calculating device for deriving an effect corresponding to a function of a plurality of independently determined mechanical effects wherein the derivation of the derived effect does not impede, or alter, the accuracy or reliability of the determination of the independent mechanical effects.

Still another object is to provide a calculating device for directly, reliably, and accurately deriving a mechanical variation corresponding to a function of a plurality of independently determined mechanical variations, and also to provide means for comparing each such derived variation with a corresponding previously derived variation for the sake of verifying the correctness of the independently determined mechanical variations.

These and other objects are achieved herewith by means of novel apparatus to be described. Included therein are a plurality of mechanically variable elements having corresponding characteristics which vary in magnitude in association with variations of the elements. Also included are means for independently varying the elements and means for derving a mechanical output variation as a function of the aggregate variations of the corresponding characteristics. In one aspect of the invention, means are provided for comparing a reference variation with the derived output mechanical variation, for the sake of verifying the correctness of the independent mechanical variations of the elements.

The foregoing, and other objects and features, may be more fully appreciated and understood when considered in connection with the following detailed description to be read in conjunction with the attached drawings wherein:

FIG. 1 is a sectional view in elevation of a device operating in accordance with this invention;

FIG. 2 is a sectional side view taken along the line 2—2 of FIG. 1;

FIG. 3 is a sectional side view taken along the line 3—3 of FIG. 1;

FIG. 4 is a sectional side view taken along line 4—4 of FIG. 1;

FIG. 5 is a side view in elevation indicated by line 5—5 of FIG. 1;

Figure 13:
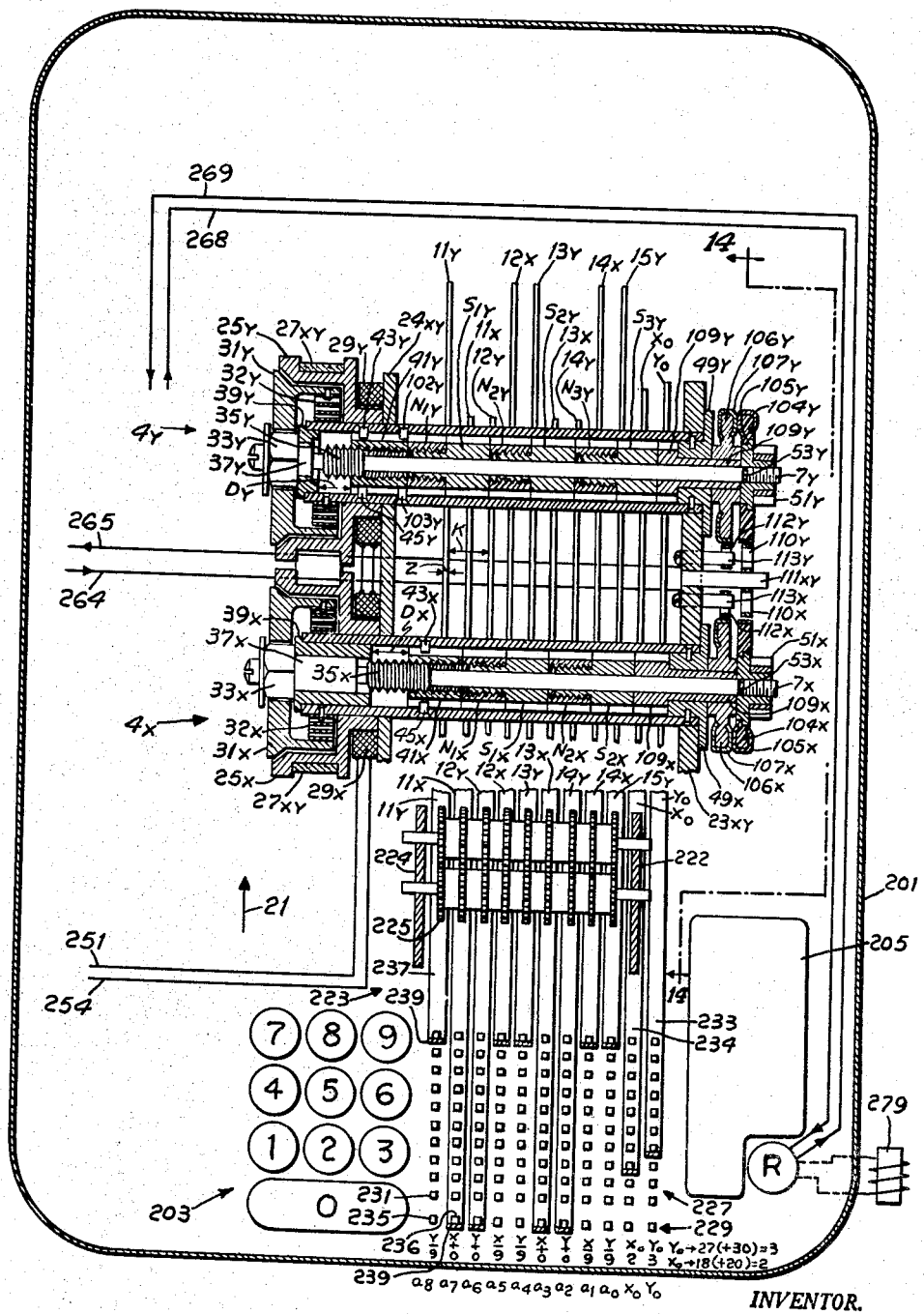

FIG. 6 s a sectional view in elevation of an alternate arrangement in accordance with the invention;

FIG. 7 is a side view corresponding to line 7—7 indicated in FIG. 6;

FIG. 8 is a view partly in elevation and partly in section of another alternate arrangement in accordance with the invention;

FIG. 9 is a sectional view taken along line 9—9 of FIG. 8;

FIG. 10 is a section along line 10—10 of FIG. 8;

FIG. 11 is a side view in elevation of the apparatus of FIG. 8;

FIG. 12 is a sectional view of still another arrangement in accordance with the present invention;

FIG. 13 is a drawing, partly schematic, partly in elevation, and partly in section, of a device operating in accordance with this invention to derive check digits in association with entries applied to a keyboard controlled bookkeeping machine;

FIG. 14 is a drawing in section of the device along the line 14—14 of FIG. 13;

FIG. 15 is a partially schematic view of the control timing mechanisms of the invention in FIG. 13;

FIG. 16 is a drawing in section taken along line 16—16 of FIG. 14;

FIG. 17 is a drawing in section of a modified basic element for use in the apparatus of FIGS. 13 to 16;

FIG. 18 is a drawing partly schematic, partly in section, and partly in elevation, of a z, or length checking assembly cooperatively associated with the x and y assemblies of FIG. 13;

FIG. 19 is a view taken along line 19—19 of FIG. 18;

FIG. 20 is a view taken along line 20—20 of FIG. 18;

FIG. 21 is a view taken along line 21—21 of FIG. 18;

FIG. 22 is an isometric drawing illustrating the basic element of FIG. 18; and

FIG. 23 is an isometric drawing illustrating the verification switching contact mechanism for comparing the relative positions of the z-rack and the keyboard indexed z-pin.

Referring to FIGURES 1 through 5, various sectional views, of a device operating in accordance with this invention, are illustrated. The device includes a plurality of variable elements $E_1$, $E_2$, and $E_3$, other variable elements being indicated diagrammatically by the dotted lines at 5. Variable element $E_1$, comprises a screw member $S_1$, rotatably and translatably mounted on a shaft 7, and a nut member $N_1$, mounted on and spirally mated with a screw member $S_1$, and therefore translatable with respect thereto, when the members are differently rotated. Similarly, element $E_2$ includes spirally mated screw and nut members, $S_2$ and $N_2$, respectively, which are mounted as a combination on shaft 7. All of the other elements being similarly constituted, only the nut member $N_3$ of element $E_3$ is illustrated, the remaining elements being indicated diagrammatically by the dotted lines at 5 to simplify the drawings.

The elements $E_1$, $E_2$, $E_3$ . . . are all enclosed within a stationary housing 9 having openings therein through which elongated racks, 11 through 15, communicate with corresponding ones of the elements. Rack 13 is coupled to nut member $N_2$ by means of mating gear, teeth extensions 17 and 19, provided respectively on the nut member and rack, as indicated in FIG. 2. Rack 14 is similarly pinioned to screw member $S_2$ by means of an outer gear extension on the screw member, which, for simplicity, is not shown. Similarly, racks 11 and 12 are respectively coupled to nut and screw members $N_1$ and $S_1$ of element $E_1$.

In operation, the elements $E_1$, $E_2$, $E_3$ . . . are free to slide independently, as integral units, along the shaft 7, and each element is capable of undergoing a lateral length variation which is determined by the relative rotations between the nuts and screw members of the element, this being in turn dependent upon the relative displacements of the racks coupled to the screw and nut members in a direction parallel to that indicated at 21.

The housing 9 is rigidly fitted into base plates 23 and 24, and a driven member 25, which is rotated by a belt 27, is journaled on the housing, as indicated in FIGS. 1 and 4. A magnetic clutch 29, when actuated, frictionally couples the rotating member 25 to a rotatable member 31, which is splined to an extension 33 of shaft 7, and connected to housing 9, by means of a rivet 34, a coil spring 32 and a rivet 36. At the left, in addition to extension 33, shaft 7 is provided with a threaded extension 35 and a rounded extension 37 which is journaled in a bushing 39 rigidly press-fitted into housing 9. Threaded portion 35, of shaft 7, mates with a translatable member 41 which is prevented from rotating by means of keys 43 and 45 fitted into grooved keyways 47 and 48 provided respectively at the top and bottom of member 41, said keyways extending parallel to the shaft extension 35.

At the right, shaft 7 is journaled in a bushing 49 which is rigidly press-fitted into the housing 9. At the extreme right, a gear 51 is rigidly attached to shaft 7 by means of a connecting pin 53. The shaft 7 together with its extensions 51, 35, 37, and 33, and also together with the translatable member 41, the members 31 and 25, and the actuating elements 27, 29, and 32, comprise a micrometer assembly 4, which serves to selectively measure the aggregate length, of the entire assembly of elements $E_1$, $E_2$, $E_3$ . . . in the following manner.

Bushing 39 prevents shaft extension 33, and therefore shaft 7, from moving to the right. Similarly, bushing 49 prevents the shaft gear extension 51, and therefore shaft 7, from moving to the left. It follows that shaft 7 and its extensions are only free to rotate, and cannot be translated. The shaft, when viewed from left to right, as in the section of FIG. 4, is rotated counterclockwise when member 31 is frictionally coupled to member 25 by magnetic clutch assembly 29. Counterclockwise rotations of the shaft result in relative rotation between the shaft extension 35 and the member 41, because of the keyed rotational restraint placed on member 41, by key 43. Accordingly, if the extension 35 rotates counterclockwise, the member 41 translates laterally to the right, sliding the elements $E_1$, $E_2$, $E_3$ . . . until they are all abutting as shown in FIG. 1. When this occurs, shaft extension 35 continues to exert a lateral force on member 41, but member 41 is prevented from moving to the right by the variable elements, the elements exerting a lateral force equal and opposite to that of the frictional coupling between the members 31 and 25. In this position then the shaft angular displacement represents the required function of the individual lateral variations of the elements E, and an output indicative of the angular displacement may be obtained as described below.

When the magnetic clutch assembly 29 is deactivated, the coil spring 32 exerts a clockwise torque on the shaft 7 rotating the shaft relative to member 41 until member 41 is retracted against bushing 39, at which time the member 41 is locked in place and further movement of the shaft is prevented. In the position where the spring is unwound, the position of the member 41, in relation to the aggregate extent of the elements $E_1$, $E_2$ . . . is such that the elements are free to undergo a maximum aggregate expansion without touching member 41. The maximum extension of the individual elements E is determined by the maximum relative displacements which the racks 11 through 15 may undergo. For a given maximum rack displacement, the widths of the outer pinion extensions of the nut and screw members, and the maximum retracted displacement of member 41, are so designed as to preclude the possibility of disengagement of the outer gear extension of any nut or screw member from the corresponding rack. An example of a particular design is furnished in connection with the discussion of FIG. 13, given below.

It may thus be appreciated that the elements E undergo an aggregate expansion or contraction, within limits, which may be measured by means of the micrometer assembly 4. The results of each such measurement may be displayed by means of printing apparatus, a portion of such apparatus being shown at 55. Printing apparatus 55 is coupled to the shaft 7 through gear 51 and coupling gear 57, the latter being journaled in a hold provided in base plate 23 by means of a shaft 59, and held to the shaft 59 by means of the screw 61. Thus, when shaft 7 is rotated by means of clutch asesmbly 29 to the position wherein all of the elements E are abutting, the printing apparatus is fixed in a position wherein symbols representative of the angular position of the shaft 7, may be impressed upon a piece of paper brought into contact therewith. Alternately, gear 51 may be connected to the wiper arm of a potentiometer, and thereby deliver a continuously variable voltage related to the angular rotation of the shaft 7, this voltage being referenced to a voltage corresponding to the fully retracted micrometer position wherein member 41 abuts bushing 39.

The advantages of the invention may now be appreciated. By making the interfaces between the screw member of each element and the nut member of the adjacent element smooth, the elements themselves offer minimal resistance to the operation of the racks 11 through 15. Also, the micrometer assembly 4 may be isolated from the element assembly E, so that the micrometer operation can be arranged to offer minimal interference wth the determination of the final positions of the racks 11 through 15. This may be accomplished by operating the magnetic clutch 29 only at a time after the final position of the racks has been completely determined, and otherwise leaving the magnetic clutch deactivated. It should therefore be understood that the elements themselves and the associated measuring apparatus offer minimal impedance to the motion of the racks 11–15, the possibility of an erroneous determination of the rack positions being thereby lessened.

Referring now to FIG. 6, an alternate embodiment of the invention includes a housing 9a, mounted on base plates 23a and 24a, as before. The housing is provided with press-fitted bushings 39a and 49a, on respective left and right extremities thereof. A shaft 7a, mounted in bushings 39a and 49a, is shaped so as to be unable to rotate relative to the bushings, as indicated by the square cross section in FIG. 7. Shaft 7a is also prevented from translating laterally, by means of a pin 71. Shaft 7a further includes a threaded extension 35a which mates spirally with a movable member 69. Member 69 is pinioned with a gear 67 driven by a cltuch actuated member 31a. The gear 67 is journaled on a shaft 65 mounted on the base plate 23a. Since the shaft 7a and all of its extensions are fixed both as to rotation and translation, it is clear that rotations of gear 67 will produce corresponding translations of the member 69. As before, the translatable micrometer member 69 is normally positioned so as not to interfere with the determination of the positions of the elements which are to be measured in aggregate. These elements are shown as $E_{1a}$, $E_{2a}$, $E_{3a}$, . . . . Element $E_{1a}$ includes a nut member $N_{1a}$ threaded on to a screw member $S_{1a}$. Similarly, element $E_{2a}$ includes nut and screw members $N_{2a}$ and $S_{2a}$, respectively, and element $E_{3a}$ includes nut and screw members $N_{3a}$ and $S_{3a}$, respectively. All of the screw members are splined to the shaft 7a so as to be translatable, but unable to rotate relative thereto. The screw members preferably have square interior cross sections corresponding to the square cross section of shaft 7a shown in FIG. 7.

The nut members, on the other hand, are rotatably mounted on the corresponding screw members, and receive rotational torques from racks 11a through 15a, which are pinioned thereto. It follows that the elements $E_{1a}$..., may be laterally varied, as in the device of FIG. 1, but with the substractive relationship between the mated screw and nut members eliminated. As in FIG. 1, the lateral element variations must be constrained in accordance with the maximum possible rack displacement so as to preclude disengagement, of the nut member having the smallest length pinion extension, from the corresponding rack.

In operation, the device of FIG. 6 is initially conditioned by placing the racks 11a through 15a in the previously mentioned reference positions. Thereafter, depending upon the application involved, the racks are displaced within a limited range, exerting rotational torques on the corresponding nut members, and thereby varying the aggregate lateral extent of the elements. Subsequently, driven member 31a is frictionally engaged, turning gear 67 which rotates member 69. The shaft 7 being prevented from rotating, member 69 advances to the left relative to the fixed extension 35a of the shaft. As it advances, member 69 slides the variable elements $E_{na}$ to the left by virtue of the splined screw member connections. When the elements $E_{na}$ are all abutting, the frictional torque on member 31a is overcome by the connected elements and the measurement is completed. After an appropriate output has been obtained, the magnetic clutch is deactivated, and a spring 32 as in FIG. 1, retracts element 69 to the extreme right position adjacent bushing 49a.

It should be noted that although the nut members and racks are rotatably linked, and the screw members are rotatably restrained by the spline fittings shown in FIG. 6, the converse is equally feasible. That is, the shaft may be round in cross-section and the screw members mounted so as to rotate and translate relative thereto, while the nut members are rotatably restrained. In this instance, the racks should all be coupled to the screw members and the nut members should be keyed to grooves provided in the housing 9, or key projections from the housing may be provided to mate with grooves on the nut members.

Referring to FIG. 8, still another embodiment of the present invention includes a plurality of elements $E_{1b}$, $E_{2b}$, $E_{3b}$, and $E_{4b}$. The elements in question are shaped in the form of complementary wedges as shown, and linked to racks 11b through 14b, respectively. A lengthwise view through rack 13b is shown in FIG. 9, and a sectional view taken through all of the elements is shown in FIG. 10. The views, in FIGS. 9 and 10, indicate that each of the elements is mounted on the corresponding rack by means of a pin which is integral with the elements but translatable relative to the racks. For example, element $E_{3b}$, mounted on rack 13b, is in the form of a C-shaped member 76 with a connecting pin 77, journaled in a hole provided in the rack 13b, permitting lateral movements of the member. It is thus seen that displacements of the racks 11b through 14b result in a relative variation in the vertical positions of the corresponding elements $E_{1b}$ through $E_{4b}$, such that if the elements are brought together laterally, the distance between the left extremity of element $E_{1b}$ and the right extremity of element $E_{4b}$ represents a function of the aggregate displacements of the racks. To bring the elements together laterally and thereby to provide a measure of the aggregate of the lateral variations of the elements, a shaft 81 is provided having gears 83 and 85 at opposite ends thereof. Gears 83 and 85 mate respectively with gears 87 and 89 having threaded extensions 91 and 93, respectively, which are threaded into corresponding clamping members 95 and 97. Gears 87 and 89 are laterally restrained by means not shown, while clamping member 97 is rotatably restrained by fixed side plates, 99 and 101, shown in FIG. 11 which is a view in elevation looking from right to left in FIG. 8, and member 95 is similarly restrained. The threaded portions 91 and 93 of gears 87 and 89 are oppositely directed, one of said portions corresponding to a right hand thread and the other to a left hand thread, so that as shaft 81 is rotated in one sense, the clamping members 95 and 97 are brought together, thereby placing the elements $E_{1b}$ through $E_{4b}$ in abutting relation, and conversely, as shaft 81 is rotated in the opposite sense, the clamping members 95 and 97 are spread apart. It should be understood that the restrictions on the maximum lateral traverse of the elements and on the positioning of the clamping members 95 and 97 are determined in exactly the same manner as those relating to the corresponding restrictions in the preceding versions.

In connection with the embodiment shown in FIGS. 8–11, is should be noted that the elements need not be wedge shaped, so long as the adjacent surfaces are complementary, to provide the desired lateral variations. It should further be noted that while the elements $E_{1b}$ to $E_{4b}$ are shown as being translatable relative to the corresponding racks, this is not necessary where the racks are readily flexible in the lateral direction, provided that the lateral deviations are small in relation to the vertical rack displacements. In the latter instance, the elements may be connected directly to the corresponding racks without significantly impeding, or otherwise affecting the accuracy of the independently determined "vertical" displacements.

While the foregoing embodiments have included frictionally clutched micrometer assemblies, this should by no means be construed as a limitation on the invention. Many alternative driving arrangements will readily occur to those skilled in the art, and, where the measurement output is delivered through a very light-weight element, such as a galvanometer slider, in contrast to the geared print wheel of FIG. 1, an even simpler arrangement is possible. Specifically, referring to FIG. 12, the micrometer assembly may be replaced on the left-hand side by a low-tension spring 40 and a sliding output member 100, interposed between bushing 39, and left-most nut member $N_1$ of element $E_1$.

While the laterally variable members in preceding discussions have been driven by racks which engage outer gear or pinion extensions of the members, this should also not be construed as a limitation on the invention, since those skilled in the art may readily devise alternative displacement coupling arrangements, without deviating from the true spirit and scope of the invention as indicated in the appended claims.

As previously indicated in the introduction the basic device herein is subject to a wide variety of weighted summing applications. However, the most unique and important application—the one for which the device was originally conceived—relates to the adaptation of keyboard operated bookkeeping machines, and similar electromechanical devices, to provide for the efficient derivation, and manual selection of correlating check symbols, in association with amounts processed in the machine, and also to provide for a comparison between the derived and selected check symbols for the sake of verifying the accuracy of the processing.

FIGURES 13 through 16 illustrate modifications to an existing bookkeeping machine—originally having a capacity to receive keyboard entries including up to eleven significant figures—by means of which the desired functions are obtainable. In this particular arrangement, the check symbols in question comprise two check digits directly derived, in accordance with the present invention, from previously available mechanical couplings to limit stops projected from either a set of storage registers, or from a keyboard operated selection matrix, the limit stops corresponding to digits of a number. The two check digits are derived in association with a highly effective checking formula based upon a large number of observations relating to indexing errors associated with the manual selection of keys which transfer numerical representations. To illustrate this formula, consider, for example, a five digit decimal number N, where:

$$N = a_0 10^0 + a_1 10^1 + a_2 10^2 + a_3 10^3 + a_4 10^4 \quad (1)$$

In applying the checking formula two decimal digits designated X and Y, are derived as follows:

$$X = a_1 + a_3 \text{(MODULO 10)} \quad (2)$$

$$Y = a_0 + a_2 - a_4 \text{(MODULO 10)} \quad (3)$$

Thus, the check digits for the number $N = 53,249$, are $$X = -4 + 3 = -1 = +9 \text{(MODULO 10)}$$
$$Y = -9 + 2 - 5 = -12 = -2 \text{(MODULO 10)} = +8 \text{(MODULO 10)}$$

In general, the number N defined in (1), above, may have any number of significant digits up to the capacity of the machine. Thus, we may say:

$$N = a_0 10^0 + a_1 10^1 + \ldots + a_n 10^n \quad (1')$$

where $n$ is an arbitrary integer whose maximum value depends on the machine capacity. Further, Equations 2 and 3 may then be more generally expressed as:

$$X = -a_1 1 + a_3 \cdots + a_j (-1)^{\frac{j+1}{2}} - \cdots + a_n (-1)^{\frac{n+1}{2}} \text{(MODULO 10)} \quad (2')$$

$$Y = -a_0 + a_2 \cdots + a_{j-1}(-1)^{\frac{j+1}{2}} - \cdots + a_{n-1}(-1)^{\frac{n+1}{2}} \text{(MODULO 10)} \quad (3')$$

assuming that $n$ is an odd integer, and:

$$X = -a_1 + a_3 \cdots + a_j (-1)^{\frac{j+1}{2}} - \cdots + a_{n-1}(-1)^{n/2} \text{(MODULO 10)} \quad (2'')$$

$$Y = -a_0 + a_2 \cdots + a_{j-1}(-1)^{\frac{j+1}{2}} \cdots + a_{n-2}(-1)^{n/2} + a_n(-1)^{\frac{n+2}{2}} \text{(MODULO 10)} \quad (3'')$$

assuming that $n$ is an even integer.

An even more general, and more effective set of expressions, is as follows:

For odd values of $n$:

$$X = -a_1 w_1 + a_3 w_3 + \cdots + a_j (-1)^{\frac{j+1}{2}} w_j + \cdots + a_n (-1)^{\frac{n+1}{2}} w_n \text{(MODULO 10)} \quad (4)$$

$$Y = -a_0 w_0 + a_2 w_2 \cdots + a_{j-1}(-1)^{\frac{j+1}{2}} w_{j-1} \cdots + a_{n-1}(-1)^{\frac{n+1}{2}} w_{n-1} \text{(MODULO 10)} \quad (5)$$

and for even values of $n$:

$$X = -a_1 w_1 + a_3 w_3 + \cdots + a_{n-1}(-1)^{\frac{n}{2}} w_{n-1} \text{(MODULO 10)} \quad (4)$$

$$Y = -a_0 w_0 + a_2 w_2 + \cdots + a_{n-2}(-1)^{\frac{n}{2}} w_{n-2} + a_n (-1)^{\frac{n+2}{2}} w_n \text{(MODULO 10)} \quad (5)$$

Where the factor $w_j$ in each expression, are non-zero integral weighting factors at least one of which is not equal to unity.

In utilizing the relations (2'), (3'), (2") and (3") to derive check digits for numbers N, it has been determined that over 99% of all common bookkeeping errors may be readily detected. More specifically, when erroneous numbers $N_e$ are entered in place of correct amounts N, and the errors are so chosen as to correspond—in terms of type of error and frequency of occurrence—to common bookkeeping errors determined from an analysis of a large number of previously examined and corrected bank bookkeeping entries, it has been shown that for over 99% of such entries the check digits derived from $N_e$ differ from those derived from N. It follows that if for any amount N, a correct pair of check digits is initially determined in accordance with the above relations, then the amount N may thereafter be repeatedly transferred in connection with many different bookkeeping operations, with better than a 99% probability that check digits corresponding to incorrect transfers will not correlate with the initially determined check digits. If the relationships (4) and (5) or (4') and (5') are used, the probability of error detection is increased but the equipment construction is more complicated.

My approach to electromechanical error detection is particularly advantageous in bank bookkeeping operations, where a negotiable instrument is handled many times, from the time of initial deposit by a payee until it is returned to the payor with the latter's bank statement. In the interim, assuming the instrument is fully honored, the face amount must be transferred from the instrument to the payee's account as a credit, and from the instrument to the payor's account as a debit. The face amount must also be considered in determining daily totals, in determining net balances between collecting banks, and in determining statistics relating to regional and local volumes of business, and so on. Thus, by initially transferring correct check digits, in accordance with the foregoing, to a negotiable instrument, or to any record, in association with a corresponding amount, the instrument or record may thereafter be processed repeatedly, in an accurate, efficient and reliable manner by relatively unskilled clerks. The same is true of balances forwarded during posting operations; by calculating and printing correct check digits with each balance amount, the balance amount may be thereafter more reliably and accurately forwarded to accumulating storage register, at the beginning of debit or credit posting operations.

This may be more fully appreciated by considering the apparatus shown in FIGS. 13 to 16, which may be employed to enable relatively unskilled clerks to operate efficiently in the foregoing manner. FIGURE 13 is a view partly in section, partly in elevation, and partly schematic of a bookkeeping machine for use in recording bank transactions as modified in accordance with the foregoing, and FIGURES 14 to 16 are sections therethrough as indicated. The machine, as it existed prior to the present modification, is readily available commercially and includes the following unmodified items, referring to FIGS. 13 through 16.

A base 201 supported on legs 202, and on which all of the other components are supported; a set of digit keys 203 by means of which a decimal number—having up to eleven significant figures—may be selected; a set of control keys 205 which control the accumulation—in both sense and magnitude—of numbers selected by means of the keys 203, as well as the printing of the selected numbers, and the printing of accumulated totals, and subtotals; the printing is effected by print wheels 238 indicated in FIG. 16. Also included are a motor 207, which is supplied with and operated by 60 cycle, 115 volt electrical energy, delivered from a pair of terminals 210 and 211 to the respective terminals 212 and 213 of the motor.

Referring to FIG. 15 the unmodified machine further includes:

A rotatable shaft 215 on which is mounted a disc 217 having a shaft 219 eccentrically journaled therein; a lever 221, journalled on shaft 219, so as to reciprocate in the direction 21 in synchronism with revolutions of shaft 215. Shaft 215 is frictionally coupled (by means not shown) to shaft 209 of motor 207. Also included are a latch restraint (not shown) which is engageable with a catch (not shown) on shaft 215 to hold the shaft in a reference position. This latch is temporarily released when certain ones of the control keys 205 are operated, enabling shaft 215 to undergo a single revolution from the aforementioned reference position, this revolution corresponding to, and defining a complete cycle of machine operation. Other components, referring to FIG. 13, are a set of 11 racks 223, so coupled to the lever 221 of FIG. 15 (by means not shown), as to reciprocate therewith, in direction 21, from and to reference positions thereof corresponding to the reference or starting position of shaft 215. The rack positions correspond to machine digit places and the extents of the rack displacements away from the reference position (upwards in FIGURE 13), are individually determined by variably positioned pin limit stops interposed in the displacement paths of the corresponding racks in accordance with selected digit conditions. In general, two sets of pin limit stops are provided; one set being capable of providing a representation of the positions of digit storage registers 225 which store totals of amount processed by the machine, and the other set being capable of providing a representation of digit amounts selected by means of digit keys 203. The set of stops associated with the keys 203 generally comprises a ten row by eleven column matrix, of rack limit stops 227, mounted on a traversable carriage (not shown), which, prior to the selection of any digit, is held against the action of a spring (not shown), in an extreme position to the right of a set of carriage limit stops 229 by means of a pin 235 extending from the carriage, which, in operation, engages a fixed catch (not shown) connected to the base 201. When the first (most significant) digit is selected, a mechanism (not shown) depresses a corresponding digit pin in column 231 of matrix 227, and it also depresses pin 235 releasing the pin carriage for translation to the left until pin 236 engages the fixed catch. In this position pin column 231 is aligned with rack 233 at the extreme right. Succeeding digit key selections result in similar digit pin depressions from succeeding columns of matrix 227, to the right of column 231 and also result in the successive depressions of carriage limit pins to the right of pin 235 shifting the pin carriage to the left so as to align the last selected digit pin column with rack 233, and the previously selected digit pin columns with successive racks to the left of rack 233; the lower extremities of the racks 223 are fitted with catches 239 which engage the depressed digit pins selected by keys 203 when the racks are moved forward from the reference position upon actuation of shaft 215; in the position shown, eleven digit selections have been made, moving the pin carriage to its extreme left position; the digits selected, in order of time of selection and descending significance, are 90099009923, and the racks 223 are shown in corresponding limit positions in FIG. 13.

The modifications of, and additions to, the above-indicated conventional bookkeeping machine, in accordance with this invention, are as follows, referring to FIGURES 13 through 16.

Two of the digit places of the banks of storage registers 225 have been deleted; these formerly engaged with respective racks 233 and 234 during the retraction phase of the rack displacement cycle, as do the remaining registers with the remaining racks. From the preceding discussion, it is clear that the ultimate positions of the racks 233 and 234 which are in line with the deleted register places are determined by and correspond to the last two digit selections made on keyboard 203. It is thus noted that in the modified machine, the last two digit places are special digit places reserved for digits which are not significant with respect to the accumulation of totals.

In the modified machine, the racks 223 are successively designated, from left-to-right in FIG. 13, as racks $11_y$, $11_x$, $12_y$, $12_x$, $13_y$, $13_x$, $14_y$, $14_x$, $15_y$, $X_0$ and $Y_0$, respectively. Wherever used, the letter X identifies apparatus concerned with the determination, and utilization, of a check digit in accordance with Equation 2′ or 2″, above, and similarly the letter Y relates to apparatus concerned with the determination and utilization of check digits in accordance with Equation 3′ or 3″.

Racks $11_x$ and $12_x$ are respectively coupled to outer pinion extensions of nut and screw members $N_{1x}$ and $S_{1x}$ which are spirally mated to form a variable length composite element, corresponding to the element $E_1$ of FIG. 1. Similarly racks $13_x$ and $14_x$, are respectively pinioned to nut and screw members $N_{2x}$ and $S_{2x}$, comprising a variable length composite element. These variable length composite elements are slidably and rotatably mounted on a shaft $7_x$. The aggregate length, of the assembly of "X" elements, is used to determine a check digit X, in accordance with Equation 2″, in a manner to be described.

Similarly, racks $12_y$ and $13_y$ are respectively coupled to outer pinion extensions of nut and screw members $N_{2y}$ and $S_{2y}$, to form a variable length composite element, and racks $14_y$ and $15_y$ are similarly pinioned to respective nut and screw members $N_{3y}$ and $S_{3y}$ of an associated variable length element.

The rack on the extreme left $11_y$, is pinioned to a screw member $S_{1y}$, of a corresponding element. Member $S_{1y}$ is mated to a nut member $N_{1y}$ which is pinioned against rotation by keys $102_y$ and $103_y$ extending into laterally directed keyways of the nut member. Thus, nut member $N_{1y}$ is capable of translating, but cannot rotate. This last arrangement is required because there are an odd number of digit racks coupled to the Y assembly, and therefore an odd screw or nut member is needed to determine the aggregate lateral "Y" variations. The screw members of the "X" elements, are rotatably and slidably mounted on a shaft $7_x$, and those of the "Y" elements are similarly slidably and rotatably mounted on a shaft $7_y$.

An electrically non-conductive disc $104_x$, including an outer gear extension $51_x$, is held to the shaft $7_x$ by means of a pin $53_x$. The outer rim of disc $104_x$ is circumferentially coated with an electrically conductive material which extends along the face of the disc, at one radial position thereof, parallel to the axis of shaft 7, as indicated at $105_x$. Loosely mounted on shaft $7_x$ is a rotatable member $109_x$ which is prevented from translating with respect to the shaft by means of a bushing $49_x$ fitted into housing $9_x$, which laterally restrains a disc extension $106_x$, of the member $109_x$, the extension $106_x$ being situated to the right of the bushing. Disc extension $106_x$ has a conductive periphery similar to that of extension $104_x$ of shaft $7_x$, and one particular point on the periphery of disc $106_x$ is extended laterally in a conductive projection $107_x$. Conductive projections $105_x$ and $107_x$ are so arranged that when disc extensions $104_x$ and $106_x$ are in corresponding angular positions, there is conductive continuity between the peripheries of the discs $104_x$ and $106_x$. The angular position of disc $106_x$ is determined by the displacement of rack $X_0$ in direction 21, rack $X_0$ being coupled to disc $106_x$ through a pinion extension provided on member $109_x$.

Similarly, the rack $Y_0$ is pinioned to a member $109_y$ rotatably mounted on a shaft $7_y$, and restrained from translating relative to the shaft by means of a disc projection $106_y$, laterally restrained by the bushing $49_y$. Further, an electrically non-conductive disc extension $104_y$ attached to shaft $7_y$ by means of a pin $53_y$, is provided with a conductive outer periphery which is laterally extended at a unique radial point $105_y$, and disc $106_y$ is similarly provided with a conductive periphery having a unique lateral extension $107_y$, by means of which conductive continuity can be uniquely established between the peripheries of the discs $104_y$ and $106_y$ as a function of the relative posititions thereof.

Referring to FIGURES 13 and 14, the peripheries of discs $104_y$ and $106_y$ are respectively contacted by electrically conductive brushes $110_y$ and $112_y$, while those of disc extensions $104_x$ and $106_x$ are contacted by respective conductive brushes $110_x$ and $112_x$. Brushes $112_x$ and $112_y$ are respectively connected to conductive contact extensions $113_x$ and $113_y$, of a non-conductive portion of plate $23_{xy}$, which, together with the plate $24_{xy}$, supports the X and Y assemblies. The brushes $110_y$ and $110_x$ are electrically connected and supported on a fixed shaft $111_{xy}$ extending from the plate $23_{xy}$. Thus, serial electrical continuity—from contact $113_x$ through the peripheries of disc extensions $106_x$, $104_x$, brushes $110_x$, $110_y$, extensions $104_y$ and $106_y$ to the contact $113_y$ is uniquely established only when the discs $104_x$ and $106_x$, and the respective discs $104_y$ and $106_y$, are coincidentally situated in corresponding angular positions.

The angular positions of discs $104_x$ and $104_y$ are respectively determined by the angular positions of the shafts $7_x$ and $7_y$, which are provided with integral threaded extensions $35_x$ and $35_y$ respectively. Shaft $7_x$ also includes extensions $37_x$ and $33_x$, respectively journaled in, and laterally retained by, a bushing $39_x$. Extension $33_x$ is splined to a rotatable member $31_x$ which is rotationally restrained by a coil spring $32_x$.

Similarly, extensions $35_y$, $37_y$, and $33_y$ are provided on shaft $7_y$, the latter extensions being retained by a bushing $39_y$, and splined to a rotatable member $31_y$ which is rotationally restrained by a coil spring $32_y$.

Magnetic clutches $29_x$ and $29_y$, connected in parallel circuit, are employed to simultaneously couple rotatable members $31_x$ and $31_y$ to the respective driven members $25_x$ and $25_y$ which are continuously driven by means of a belt $27_{xy}$ coupled to the motor 207. The threaded extensions $35_x$ and $35_y$ of the respective shafts $7_x$ and $7_y$, are spirally mated with rotationally restrained members $41_x$ and $41_y$. Member $41_x$ is rotationally restrained by means of keys $43_x$ and $45_x$ projecting into longitudinal keyways included within the member, thereby preventing all but translational motions of the member. Similarly, member $41_y$ is restrained by keys $43_y$ and $45_y$ projecting into keyways within the member so as to prevent all but translational motions of the member $41_y$.

The shaft $7_x$, its extensions, and the apparatus for rotating the shaft together comprise a micrometer assembly $4_x$, and the corresponding assembly including shaft $7_y$ is designated micrometer assembly $4_y$. Micrometer assemblies $4_x$ and $4_y$ are maintained in a retracted position when not in operation, with springs $32_x$ and $32_y$ partially uncoiled so as to bring the respective members $41_x$ and $41_y$ into extreme left hand positions against the respective bushings $39_x$ and $39_y$. The racks 223 are ordinarily fully retracted, when idle, to limiting positions below the lowest row of pins of the matrix 227.

In operation, a control key 205 is selected, initiating a cycle of operation wherein the lever 221 of FIG. 15 is reciprocated by the shaft 215, releasing (by means not shown) the racks 223 of FIG. 13 which are spring urged (by means not shown), in the direction of arrow 21 and which are individually stopped by associated pin extensions of matrix 227, or by a conventional zero suppression bar, not shown. As the racks move in direction 21, the "X" and "Y" nut-screw assemblies pinioned therewith are differentially expanded or contracted in accordance with the Equations 2″ and 3″, above. Referring, again to FIG. 15, at a predetermined phase of the operating cycle, after the racks have all reached their associated stop positions, as selectively determined by pin matrix 227, a projection 246, of a cam 245 mounted on shaft 215, actuates a switch operating lever 247, closing the contacts of a switch 249, thereby completing an electrical circuit which includes conductors 251 and 253, a.d.c. source 255, a conductor 254 and the magnetic clutches $29_x$ and $29_y$ of FIG. 13, shown schematically as a block in FIG. 15. As a result, the magnetic clutches engage and rotate the X and Y micrometer assemblies until the members $41_x$ and $41_y$ are translated as far to the right as the corresponding "X" and "Y" variable length assemblies permit.

Referring to FIGURES 14 and 16, gears $51_x$ and $51_y$ rotating with the micrometer assemblies position corresponding check digit print wheel assemblies $131_x$, and $131_y$, by means of intermediate respective gears $115_x$ and $115_y$, $119_x$ and $119_y$, $121_y$ and $121_x$, and $127_y$ and $127_x$. Simultaneously, amount print wheels are positioned in accordance with the displacement of the racks to the right of the racks $X_0$ and $Y_0$ in FIGURE 16. Two of the amount print wheels are shown in FIG. 16 at $133_y$ and $133_x$, and intermediate coupling gears are shown therein at $122_y$, $122_x$, $123_y$, and $123_x$. These are respectively coupled to the racks $15_y$, $14_x$, $14_y$ and $13_x$ by intermediate gears not shown. It should be noted that the positions of the racks $X_0$ and $Y_0$ do not affect the aggregate lengths of the X and Y assemblies and therefore these racks do not affect the rotational displacements of the micrometer shafts $7_x$ and $7_y$. Also, racks $X_0$ and $Y_0$ are not coupled to any print wheels. The racks $X_0$ and $Y_0$ are reserved solely for the positioning of the discs $106_x$ and $106_y$ so as to provide keyboard indexed verification references by means of which the displacements of the micrometer assemblies $4_x$ and $4_y$ may be verified, and thus by means of which the amount represented by the other rack displacements may be verified.

The verification is controlled by means of a switch 257 (FIG. 15) which is operated by a projection 258 of a cam 259 at a predetermined time after the operation of switch 249. Prior to operation of switch 257, a closed circuit serial path is available between conductors 261 and 262 through which power is delivered from terminals 210 and 211 to terminals 212 and 213 respectively, of motor 207. When switch 257 is operated, this circuit path is opened, and conductor 261 is, instead, connected through conductors 262, and 264, to contact extension $113_x$. Also, contact extension $113_y$ is connected through the conductor 265 to terminal 213 of motor 207. Thus, when switch 257 is operated, the electrical continuity between power terminal 211 and motor terminal 213 is interrupted, but an alternative path between terminal 211 and 213 is available through the serial combination of conductors 262, 264, 265 and 266, provided that the disc extensions $104_x$ and $106_x$, and the disc extensions $104_y$ and $106_y$, are coincidentally in corresponding angular positions. If this is not the case, the motor stops turning, while the magnetic clutches remain operated, maintaining frictional engagement between the driven members $31_x$ and $31_y$ and the corresponding driving members $25_x$ and $25_y$, the micrometer assemblies being thereby retained in their fully rotated positions. To restore motor operation, it is then necessary to depress a spring restrained key designated R, preferably situated near control keys 205, to complete a circuit path, between conductors 268 and 269, bypassing the micrometer disc extension assemblies. Therefore, so long as switch R is held depressed, motor 207 continues to operate, until the cam projection 258 releases the contact arm of switch 257, and thereafter the motor continues to operate independently of switch R.

Designating the positions of cams 245 and 259 in terms of the angular position of a reference line 270 which rotates with the cams, the rack movement is so arranged in relation to the cam positions, that by the time rotating line 270 coincides with the fixed radial line 271, all of the racks 223 have been displaced to their corresponding limit stops, and the amount represented by the combination of displacements of the racks 223 has been verified. This amount is then printed out on a web of paper, or other medium 241 (FIG. 14) backed by a drum 243, or equivalent conveying apparatus, while simultaneously, x and y check digits, derived from the respective rotations of micrometer assemblies $4_x$ and $4_y$, are selectively printed out, adjacent the printed amount, and/or elsewhere, as required, the magnetic clutches $29_x$ and $29_y$, remaining energized, thereby holding the $x$ and $y$ micrometers in position.

As the cams continue to rotate, switch 249 is opened de-energizing the magnetic clutches $29_x$ and $29_y$ and releasing the corresponding micrometers. Concurrently, the accumulating storage registers 225 are engaged and racks 223 are all retracted to their initial reference positions, while corresponding displacements are added to or subtracted from those stored in the registers 225, thus accumulating the amount represented by the pin limited forward displacements. Finally, the reference line 270 returns to an initial reference position and the cam shaft 215 is disengaged from motor 207 by a previously existing latching mechanism (not shown), and the cycle of operation is completed.

Thus, it may be appreciated that if the angular positions of micrometer discs $104_x$ and $104_y$—as determined in combination by the forwardly displaced racks—simultaneously coincide with the respective angular positions of disc extensions $106_x$ and $106_y$—as determined by the independently positioned respective racks $X_0$ and $Y_0$—the cycle of operation will proceed uninterrupted, while, if the foregoing angular displacement conditions are not met, the cycle of operation is interrupted and the operator is required to take affirmative action (depressing key R) to restore operation. The operator is thus unavoidably made aware of the existence of an erroneous condition.

From previous discussions, it is clear that the forward displacements of racks $X_0$ and $Y_0$ are respectively determined by the last two digit selections made on keyboard 203 while the amount corresponding to a sequence of previous keyboard digit selections is registered by the other racks. This is so regardless of the number of such previous keyboard digit selections, and the last two selected digits should therefore always be check digits.

On the other hand, under certain conditions, the positions of racks $X_0$ and $Y_0$ are meaningless—as, for example, when a stored total representation is transferred from registers 225 by depressing a total key on control keyboard 205—and in such situations, the preceding verification operation is avoided by means of switch 273 which closes in association with such total transfers and provides a full cycle of electrical continuity between conductor 262 and terminal 213 of motor 207, regardless of the conditions of the X and Y assemblies and/or the reset switch R.

The same considerations apply to the entry of an amount via keyboard 203, where verifying check digits $X_0$ and $Y_0$ are not needed, or are unavailable. In this instance, switch 273 may be closed, and the last two digit selections may be made at random, on keyboard 203 so as to shift the previously selected significant digit pin stops, of matrix 227, to the left of shafts $X_0$ and $Y_0$. The operation then proceeds as before but without verification.

As an alternative to the interruption of motor 207 when verification operation is in effect, and a disagreement is detected, the electrical arrangement shown may be used to provide electrical circuit continuity between a power source and an alarm, or, between a power source and a printing mechanism for printing an error symbol adjacent the printed amount. Many equivalent possibilities will be recognized by those skilled in the art. However, those skilled in the bookkeeping machine arts will appreciate that the interruption of motor 207, or an equivalent interruption of the operating cycle at the phase indicated in FIG. 15, serves the advantageous purpose of suspending operations before any stored machine conditions can change; that is, before the storage registers 225 can be engaged, before the carriage carrying the pin matrix assembly 227 can be restored to its initial position to the right of the rack 223, and before the suspended pins of matrix 227 are reset. Hence, if desired, a relay (or solenoid) assembly may be coupled in series with the switch R as indicated by the dotted lines at 279, in FIG. 13, so that when the operating cycle is completed by means of switch R the relay may be operated and used to either prevent the storage registers 225 from becoming engaged with the retracting racks, or to preserve the condition of the pin matrix 227, so that the complement of the erroneous entry may be automatically entered during the next cycle of operation and thereby cancel the erroneous displacements which would otherwise accumulate in the registers 225.

The apparatus shown in FIGS. 13 to 16 operates in accordance with the relations previously stated in Equations 2', 3', 2", and 3" above. As previously indicated, the relations (4), (5), (4'), and (5') provide an even more accurate and effective system for error detection and control. To implement the last-mentioned relations, it is convenient to assign the values of $+1$ and $+2$ alternately to the weighting factors $w_j$. For those terms which are assigned a weighting factor of $+1$, the rack and pinion relationships are the same as provided in the apparatus of FIG. 13 for the corresponding terms of Equations 2', 3', 2", and 3". However, where the value $+2$ is assigned to a weighting factor, it is necessary to modify the corresponding laterally, variable member. This may be done by doubling the relative helical pitch of the member, either by suitably varying the dimensions of both the outer pinion extension of the member and the corresponding rack, or, by means of a dual coupling arrangement, as shown in FIG. 17, wherein a member 300 is assigned a weighting factor value of 2, and a pair of members 301 and 302 are mounted on either side of the member 300. The member on the left 301, is mated to member 300 by means of a right-hand thread and that on the right, 302, is mated by means of a left-hand thread, so that as member 300 is rotated, the members 301 and 302 are laterally displaced therefrom by equal amounts but in opposite directions, the net aggregate lateral variation being twice that experienced when either of the side members 301 or 302 undergoes a like rotational variation.

One additional detail should be noted. Those skilled in the bookkeeping machine arts will appreciate that, in general, the fully retracted racks 223 of an unmodified machine, may be offset from the positions corresponding to the operated "zero" digit positions, for reasons which are of no concern in relation to the present invention. This offset condition, however, may present a slight problem since the laterally variable assemblies and the verification members coupled to the respective racks may receive corresponding offset error displacements. This situation, if it exists in any given bookkeeping machine may be corrected by deleting teeth from the racks so as to prevent engagement with the corresponding pinion member until the racks are forwardly displaced to the pin limited zero positions. Alternatively, if an even number of racks are coupled to the laterally variable members, as in the X assembly of FIG. 13, it may be appreciated that the offset displacements will produce cancelling lateral effects, and only the angular position of the verification member $109_x$ will be affected. This latter situation is readily corrected by offsetting the lateral conductive projection $105_x$ on micrometer disc $104_x$ by a corresponding angular amount. On the other hand, if an odd number of racks are pinioned with laterally variable members, as in the Y assembly of FIG. 13, a pedetermined net lateral offset equal to the offset displacement of a single rack will always be experienced, and the verification member $109_y$ will similarly be offset rotationally by the same predetermined amount. To correct this situation, the rotational and lateral offsets should be made to correspond by having the verification member rotate in the corresponding rotational sense, and the micrometer assembly should be calibrated to compensate for both the predetermined lateral offset and the fixed rotational offset of the verification members.

As previously indicated, those skilled in the art will also recognize that design restrictions must be placed on the widths of the gear extensions of the screw and nut members to prevent disengagement from the corresponding rack pinions. From FIGURE 13, the following may be deduced:

$$D \geqslant 2np \quad (6)$$

where:

$n$ = number of screw-nut laterally variable combinations
$D$ = distance between bushing 39 and micrometer screw element 41, when screw-nut combinations are maximally contracted and translated to extreme right by element 41.
$2p$ = maximum possible expansion from positions shown in FIG. 13, of any screw-nut combination, the screw and nut members being capable of undergoing opposite lateral displacements, $p$.

From (6), we may assign a value to D as follows:

$$D = 2np + e; \quad e \geqslant 0 \quad (7)$$

Under the conditions shown in FIG. 13 (maximal contraction), if micrometer screw $41_x$ or $41_y$ is retracted to the limiting position against the respective bushing $39_x$ or $39_y$, and the coaxial screw-nut combinations are translated to the left, the outer gear extensions of the screw and nut members will slip off their respective rack pinions unless:

$$D \leqslant W - Z \quad (8)$$

where:

$W$ = the width of the gear extension of the smallest nut or screw member and Z is the width of a rack.

From (7) and (8), $$p \leq \frac{(W-Z)-e}{2n} \quad (9)$$

Optimally, $e=0$, and $W=K+Z$ (where K is the separation between racks coupled to adjacent coaxial screw and nut members), this tending to produce maximal micrometer displacement, and therefore, maximum sensitivity of measurement, as is the case in FIG. 13.

Therefore, optimally, inequality (9) becomes the equality $$p(\text{optimum}) = K/2n \quad (10)$$

Equation 10 was derived using the assumption that a displaceable rack is pinioned to every screw and nut member. When one rack is omitted, as in the $y$ assembly of FIG. 13, Equation 7 becomes:

$$D_y = (2n-1)p + e \quad (7')$$

and Equation 10 becomes:

$$p(\text{optimum})_y = K/(2n-1) \quad (10')$$

It follows that $$D(\text{optimum})_y = K \quad (7'')$$

(applying Equation 10' to Equation 7', or Equation 10 to Equation 7, and letting $e=0$ in accordance with the preceding consideration).

It should be noted that throughout the foregoing discussion of checking assemblies, it is an obviously necessary requirement that the smallest meaningful lateral variation to be distinguished by any micrometer assembly, should be discretely, accurately, and reliably observable. The smallest such variation is, of course, that corresponding to a unit digit displacement of a pinioned rack, and it is believed in accordance with the above criteria that the associated lateral variation should be not less than 0.005 inch. Further, the continuously rotated micrometer shafts of FIG. 13 are coupled to check digit print wheels which must be oriented in one of ten discrete digit rotational positions for any setting of the operated micrometer screw 41. It is thus essential that a unit digit lateral displacement of the micrometer screw should correspond within precise limits to one tenth of a check digit printwheel revolution. While a "step-up" micrometer—print wheel coupling may be provided—so that the micrometer shaft itself rotates through less than one tenth of a revolution in undergoing a unit lateral displacement—such an arrangement is believed to be impractical since it tends to place a burdensome load on the frictionally engaged micrometer assembly. Hence, for a unit lateral variation, it is believed most desirable to have the micrometer shaft undergo a precise unit variation of either one-tenth of a revolution, or an integral multiple thereof. In terms of conventional hardware then I find it most convenient to practice my invention with thread densities of 24 threads to the inch (0.047 inch per thread) provided on the micrometer shaft extensions 35, and on the nut and screw members of FIG. 13, one-tenth of a micrometer shaft revolution thereby corresponding to a lateral displacement of 0.0047 inch; approximately equal to the minimum recognizable unit.

It should be further noted that while the keyboard 203, of FIG. 13, requires the sequential selection of the digits of a character, the invention therein may be readily practiced on full keyboard calculating devices wherein for each digit place a complete column of 10 selection keys is provided. In fact, the latter keyboard arrangements simplify the foregoing operation, since the places allotted to the verifying check digits ($X_0$ and $Y_0$) may then be bypassed by merely ignoring the corresponding keyboard columns.

While the X and Y check digit deriving and verifying assemblies, discussed in connection with FIGURE 13, provide a considerable safeguard against keyboard indexing errors and other related transfer errors, it is understood that undetected errors may yet occur despite such safeguards. By their very nature, checking schemes involving check symbols having fewer digits than their associated intelligence characters require a many-two-one correspondence between intelligence characters and check symbols. Thus, for each check symbol, there may be a multiplicity of corresponding intelligence characters which are not relatively distinguishable by means of the associated check symbols. However, as previously stated, the X and Y relationship, 2 through 5, above, are specifically employed to provide check symbols by means of which the associated numbers may be distinguished in over 99 percent of all common indexing error situations. More specifically, in an analysis of errors detected during an inspection of printed entries involving over 40,000 routine numerical indexing operations, it has been determined that the check symbols assigned to the erroneous numbers differ from the corresponding correct numbers for/ over 99.6 percent of all of the erroneous numbers. The conclusion to be drawn from this is that for an average of 996 out of 1,000 erroneous operations, the indexed check symbols, as presently derived should differ from the check symbols associated with the corresponding correct number, thereby ensuring the subsequent detection of the associated errors. However, one common type of error which is not detectable by means of the above X and Y relationships involves a miskeying shift of a predetermined number of digit places, with an erroneous insertion or deletion of zeros to the right of the least significant non-zero digit; as occurs for example in the erroneous indexing situation wherein one $1,000,000.00, or $0.01, is transferred in place of the intended amount, $100.00. It has been estimated that if such "length" errors could be distinguished, an improvement ratio on the order of two-to-one would be realized, in terms of the number of undetected errors per thousand common indexing errors.

"Length" errors of the above type may be detected by means of a third, or Z, checking assembly, as shown in FIGURES 18 through 23. This assembly, while differing somewhat from the X and Y assemblies of FIGURE 13, embodies similar generic principles and is therefore disclosed herewith as another aspect of the present basic invention, which may be cooperatively employed with the X and Y assemblies in a manner to be described.

Referring now to FIGURES 18 through 23, a Z, or length-checking, assembly in accordance herewith, comprises a housing 9Z enclosing a plurality of length-determining elements $E_{1z}$ to $E_{9z}$, inclusive, which respectively communicate with the racks $11_y$, $11_x$, $12_y$, $12_x$, $13_y$, $13_x$, $14_y$, $14_x$, and $15_y$, previously shown in FIG. 13, as described below. In addition to the X and Y verification reference racks $X_0$ and $Y_0$, a third reference verification rack $Z_0$ is now provided at the extreme right rack position, making a total of 12 racks in all.

As in FIG. 13, the keyboard selection of digits results in the depression of pins in a pin matrix 227 which, in FIGURE 18, is shown in its furthermost right position, this being the initial position of the matrix prior to the selection of any digits. It will be recalled that as each digit is selected, the pin matrix moves one incremental digit place to the left, in the direction indicated by the arrow 350. Referring to FIGURE 18, when all of the digits of a number have been selected, an operating cycle is begun in which all of the racks are moved in the direction indicated by arrow 351, to positions determined by the corresponding selected digits. In order to simplify the drawings, the X and Y checking assemblies have been omitted, but it is to be understood that these assemblies cooperate with the Z assembly and that their operation is identical to that described in connection with FIGURE 13. As indicated in FIGURE 18, the right extremity of the element $E_{1z}$ is positioned at a unit distance designated $u$ from the left extremity of the rack $11_y$. Similarly, the right extremity of the element $E_{2z}$ is located a distance $2u$ from the rack $11_x$. In general, in the rest position, in which the racks are all retracted, the elements $E_{jz}$ are respectively displaced a distance $jxu$ from the respective racks immediately to the right thereof. The elements $E_{jz}$ are mounted on a shaft $7_z$ which, as seen in the isometric view of FIGURE 22, is provided with a surface thread in the vicinity of the elements. The elements $E_{1z}$ to $E_{9z}$ are threaded onto the shaft $7_z$ and engaged by a key retaining member 353 which fits into suitably provided slots such as the slot 354 shown in the element $E_{9z}$ in FIGURE 22. As indicated in FIGURE 22, the elements $E_{1z}$ to $E_{9z}$ are rotatably restrained, in relation to shaft $7_z$ by the retaining member 353, so that as the shaft rotates the elements held by member 353 advance in the direction indicated by the arow 355. For the particular element $E_{9z}$, and the particular rack $15_y$ towards which it moves during rotation of the shaft, it may be observed in FIGURE 22 that the element and rack are provided with a respective projection, and slot 356 and 357, which enable the element to pass through the rack when the rack is in the retracted position corresponding to a zero selection, the lateral progress of the element being otherwise blocked by the rack. For any such element therefore, if the corresponding rack is moved from its retracted zero position, and if the element is moved laterally to the right through the associated displacement $j.u$, the element will be stopped by the rack. Since the elements are moved laterally only when shaft $7_z$ is rotated, the shaft will be stopped when any element is stopped. The highest order digit of a selected number being represented by the position of the selected rack which is furthest to the left, it may be appreciated that the stopped position of the shaft $7_z$ will correspond to the "ten's" complement of the number of digits in the selected number. More specifically, as shaft $7_z$ is rotated, the elements $E_{jz}$, starting with element $E_{1z}$ at the extreme left, are free to move laterally through corresponding slots in the racks immediately to the right thereof, unless the associated rack has moved to a non-zero position. Accordingly, the shaft $7_z$ can rotate through a displacement corresponding to the smallest quantity $j.u$, where $j$ now represents the subscript identifying the stopped element which prevents the shaft rotation. As indicated in FIGS. 18 and 19, the racks other than the racks $X_0$, $Y_0$, and $Z_0$, are provided with extension racks suspended from an extending bracket 363, the extension racks being indicated at 364 and 365, respectively. Rack extension 364 in FIG. 19 serves as the stop rack for the element $E_{1z}$, while rack extension 365 engages storage wheels not shown. The rack extensions used to engage the X and Y elements of FIG. 13 have been omitted for convenience. As indicated in FIGURE 19, extension 364 is provided with a slot 366 which passes over the smooth outer portion of the element $E_{2z}$, the extension being slidably supported thereon. Also, as indicated, the rack is provided with a key slot 367 which is so positioned that if the racks are slightly moved from their offset fully retracted position to the zero forward position, the slot 367 is aligned with the projection 368 of the element $E_{2z}$, so that a corresponding projection on the element $E_{1z}$ is enabled to pass laterally through the slot. One end of the rack $11_y$ includes the catch projection 239 which, as previously indicated in the discussion of FIG. 13, is used to engage either a selected pin suspended from the pin matrix 227, or a zero catch 370 in the event no digit selection has been made in the associated rack file indicated in FIGS. 19 and 21, and by the dotted outline in FIG. 18, it may be noted that matrix 227 has been actuated in accordance with the five digits, 3, 4, 7, 6, and 8, in that order, so as to provide corresponding pin suspensions in alignment with the respective racks $14_y$, $15_y$, $X_0$, $Y_0$ and $Z_0$, the last three digits representing verifying check symbols. The lower end projection 239 of rack $11_y$, in the position shown, is thereby engaged by the zero contact bar indicated in section at 370 in FIGURE 19. This bar is positioned, in relation to the pin matrix 227 in FIGURE 18, to the left of the associated carriage, but is not shown therein for convenience. The bar 370 moves laterally in synchronism with the carriage of pin matrix 227 as an integral unit. It follows that when the racks move forward, the racks $11_y$, $11_x$, $12_y$, $12_x$, $13_y$, $13_x$, and $14_y$ are stopped at the zero stop position, no digits having been selected in the corresponding rack file. As a result, the corresponding elements $E_{1z}$ to $E_{7z}$ will pass through their respective slots in the associated racks, if the shaft $7_z$ is rotated, but the element $E_{8z}$ under these circumstances would be stopped by rack $14_x$. As a result, the shaft $7_z$, if rotated would only turn through an angular displacement proportional to the quantity $8u$.

The mechanism, by means of which the shaft $7_z$ is rotated, is shown in FIGURE 20. A cam 371 is shown rotatably connected to a shaft 372 which is coupled to the main motor shaft 209 (not shown, but previously considered in connection with FIGURE 15). Shaft 372 rotates in synchronism with the main motor shaft during each operating cycle of the machine, the cam rotating counterclockwise during such movement. As the cam rotates counterclockwise, a projection 373 on the cam exerts a downwardly directed force on a cam follower 374 which is rotatably mounted on a pin 375 connected to a lever arm 376 which is yoke at its upper end around the shaft 372, and at its lower end around a pin 377 connected to a plate 378 which is pivotally mounted on a shaft 379. The downwardly directed force tends to rotate the plate in the clockwise direction around the pivot 379, carrying with it a lever arm 380 connected to the right extremity of the plate. The arm 380 moves in a slot 381, within a gear 382 which is spring urged in a counterclockwise sense by a coiled spring 383. Spring 383 is connected by means of pins 384 and 385, to the shaft 386, on which the gear 382 is mounted, and to the main body of the gear respectively. A follow-up gear 387 coupled to gear 382 and rack $Z_0$, then rotates in a clockwise direction carrying the rack $Z_0$ forward. The gear 387 is fastened to shaft $7_z$ which therefore also rotates in the clockwise sense when the gear 382 is rotated counterclockwise by spring 383. As shaft $7_z$ rotates, elements $E_{1z}$ to $E_{9z}$, are laterally translated to the right until one of the elements is stopped by the corresponding rack associated with the highest order non-zero digit selection.

As cam 373 continues to rotate, the downward forces on the cam follower 374 and the pin 377 ultimately decrease. The plate 378 is then moved in a counterclockwise sense by a spring 389 which is fastened to the plate through a hole 390 therein. Ultimately, the arm 380 is driven back upward to the position shown in FIGURE 20, maintaining the gear 382 in the indicated position. It should be noted that while the arm 380 is ordinarily driven to the extreme lower edge of the slot 381 during the motion of the cam 371, the gear 382 follows only to the extent that its motion is not obstructed or prevented because of the coupling between the gear 382 and the shaft $7_z$, the latter ordinarily being held when an element thereon is obstructed by a corresponding rack representing a non-zero digit selection, the gear will usually stop at a corresponding intermediate position.

One unusual or different feature should be noted herewith; namely, the shaft $7_z$ which is analogous to the micrometer shafts $7_x$ and $7_y$ of FIG. 13, and the rack $Z_0$, which is analogous to the racks $X_0$ and $Y_0$ of FIG. 13, are both driven by the same driving source; namely the gear spring 383. In contrast, the racks $X_0$ and $Y_0$ are ordinarily driven by the same driving force which drives all of the other racks while shafts $7_x$ and $7_y$ are differently driven. It should also be noted that rack $Z_0$ is stopped, not by a pin suspended from the pin matrix 227, but by an obstruction which prevents the movement of the shaft $7_z$. The rack $Z_0$, in fact, has no projection 239 at the lower extremity thereof, since such projection is not required for the stopping of the rack. Instead, at one end, rack $Z_0$ is provided with a verification mechanism indicated generally at 390 in FIGURES 18, 21 and 23.

Mechanism 390 is used to establish the verification comparison by means of which a digit selected in the pin matrix place occupied, or in line with, the rack $Z_0$ is compared to the digit represented by the final angular position of the shaft $7_z$. The mechanism 390 (FIG. 23) includes a projecting cam 391 connected to a pin 392 which is journalled in rack $Z_0$ at one end thereof. At its other end, the pin 392 is connected to an arm 393 which is ordinarily urged in a clockwise sense, in relation to the plane of the arm, by a spring 394. The arm 393 normally abuts an arm 395 connected to a rotatably journalled pin 396, and urged, by means of a spring 397, in a counterclockwise direction. The arms 393 and 395 are preferably comprised of non-conducting material, and the springs 397 and 394 are preferably so arranged that the torque exerted by the former is less than that exerted by the latter so that the assembly comprising the two arms together is normally positioned as shown in an extreme clockwise position against an extending bracket 398. The bracket 398 includes a conductive contact extension 399 which is normally separated from a conductive contact extension 400, the latter being attached to an extension 401 of the arm 395. It follows that if the cam 391 is contacted by an extending pin, such as the pin indicated at 402 in FIGURE 21, the pin 392 will pivot in the counterclockwise sense against the torque exerted by spring 394, carrying with it the arm 393 and thereby allowing the arm 395 to pivot in a counterclockwise sense under the impetus of its associated spring 397, pressing the contacts 399 and 400 together, so as establish electrical continuity between the extended conducting leads 403 and 404, which are preferably included in a series circuit with the circuits previously considered in connection with the X and Y verification comparisons, the three X, Y and Z conditions then determining the interruption of the action of the machine when a disagreement is detected in any one of the three. The circuit between conductors 403 and 404 is closed only if rack $Z_0$ comes to rest in a position in which a pin extending from matrix 227 in line with the rack $Z_0$ contacts the cam 391, effecting closure of the circuit. In all other instances, the circuit remains open. Hence, a failure of verification is indicated during the verification phase of the machine operating cycle if the circuit is open.

In review, the present apparatus disclosed in FIGURES 18 through 23 provides a measure and associated indication of the tens complement of the number of digit places selected to the left of the rack $X_0$, thereby indicating the tens complement of the length of the number being transmitted into the machine. Although the indication is proportional to the complement of the length of the selected number, this presents no problem since a print wheel coupled to the gear 382 will also be positioned in accordance with the complement of the length of the selected number and therefore any previously printed reference number, entered in the verification place represented by the position of the rack $Z_0$, will also have been previously determined in accordance with the complement of the length of the associated number, the entire operation being thereby consistent, and also thereby determined by the length of the number selected.

Finally, while the ultimate system output produced by the present check system apparatus, is shown to be a check digit print-out, or similar display, it should be readily understood that in many instances, this output will not be required, and it may therefore be desirable in some instances to inhibit the creation of the same. For example, in some circumstances it may be desirable to use the invention exclusively for the purpose of manually verifying a list of figures, and an associated total, while inhibiting printing of the individual figures, and/or the corresponding check digits. This function not being within the scope of the present invention, the inhibition apparatus is not shown herein, but it should be clearly understood that many variations of the previously described verification and display arrangements are possible, within the indicated scope.

I claim:

1. A calculating device comprising a series of independent mechanical elements arranged to intercept variable length sections of a line common to all of said elements, means coupled to said elements for selectively varying the line sections intercepted by said elements with reference to initial idle section intercepting conditions of said elements, and means operative subsequent to each operation of said means for varying to measure the total length of said intercepted line sections by shifting all of said elements into end-to-end contact and measuring the distance between a first and last of said elements.

2. A device for mechanically producing an indication corresponding to a weighted sum of variations of a plurality of control members comprising a plurality of independently variable control members, a plurality of elements of variable dimension coupled to associated ones of said control members for variation therewith, along a line common to all of said elements, an indicating assembly mounted for movement relative to said elements along said common line, first means coupled to said assembly for urging said assembly from a reference idle position into compressive engagement with said elements, and second means coupled to said assembly for restoring said assembly to said reference idle position when said first means is inactive.

3. A calculating device comprising a plurality of independently variable control members, a plurality of elements capable of intercepting variable length portions of a line common to all of said elements, said elements being individually coupled to said control members and mounted for displacement relative to each other to vary the sum of the said intercepted line length portions in accordance with the total variations of said control members, control means coupled to said control members for cyclically operating said control members to jointly vary the said length portions intercepted by said elements by selected amounts, and thereafter to jointly restore the said length portions to predetermined idle length conditions, and means coupled to said control means and operative relative to said elements along said common line for producing an indication corresponding to a weighted sum of said joint length variations during an interval intermediate each said joint variation and the following restoration.

4. A calculating device comprising a plurality of independently variable control members, a plurality of elements of variable length coupled to said control members and mounted for movement relative to each other in a lengthwise succession, control means coupled to said control members for sequentially operating said control members to produce joint variations in the lengths of said elements followed by joint restorations of the said lengths to predetermined idle length conditions, and means coupled to said control means for producing an indication of the aggregate of said joint length variations during an interval intermediate each said joint variation and said following restoration, each said variable length element including a pair of spirally meshed screw and nut members at least one of which is coupled to a corresponding one of said control members to permit said pair to translate as a unit in the direction of said lengthwise succession, and also to translate relative to each other during operation of said corresponding control member to provide, in effect, a variation in the length of said element between a given point on said screw member and a given point on said nut member.

5. A device according to claim 4 wherein one member of each said pair constituting an element is adapted to rotate with respect to the other member of said pair, and wherein means are included for rotationally restraining the said other member.

6. A device according to claim 4 wherein both said screw and nut members of each said element are free to rotate relative to each other.

7. A device according to claim 5 including a stationary housing enclosing said elements and means coupled between one of said members of each said pair constituting an element and said housing for preventing rotation of said member relative to said housing.

8. A device according to claim 5 including a relatively stationary shaft having a non-circular cross section, and means splining one of said members of each said pair constituting an element to said shaft.

9. A device according to claim 6 wherein said control members defined in claim 3 are individually coupled to said screw and nut members for rotating the screw and nut members of each said element in the same rotational sense.

10. A device according to claim 6 wherein said control members as defined in claim 3 are individually coupled to said screw and nut members to rotate the screw and nut members of each said variable length element in opposite rotational senses.

11. A calculating device comprising a plurality of independently variable control members, a plurality of elements of variable length coupled to said control members and mounted for movement relative to each other in a lengthwise succession, control means coupled to said control members for sequentially operating said control members to produce joint variations in the lengths of said elements followed by joint restorations of the said lengths to predetermined idle length conditions, and means coupled to said control means for producing an indication of the aggregate of said joint length variations during an interval intermediate each said joint variation and said following restoration, said elements having complementary adjacent surfaces which are tapered in a direction oblique to the direction of said lengthwise succession, and said control members including means for displacing said associated elements at an angle to the direction of said lengthwise succession to produce variations in the lengths of said elements in relation to said direction of succession.

12. A device according to claim 11 wherein means are provided for preventing displacements of given ones of said elements at said angle to said direction of succession.

13. A device according to claim 11 wherein said control members are flexibly connected to said elements to permit said elements to independently translate in said direction of succession.

14. A device according to claim 13 wherein said control members comprise racks which are flexible in said direction of succession.

15. A device according to claim 11 wherein said complementary adjacent surfaces are parallel plane surfaces oblique to said direction of succession.

16. A calculating device comprising a plurality of independently variable control members, a plurality of elements of variable length coupled to said control members and mounted for movement relative to each other in a lengthwise succession, control means coupled to said control members for sequentially operating said control members to produce joint variations in the length of said elements followed by joint restorations of the said lengths to predetermined idle length conditions, and means coupled to said control means for producing an indication of the aggregate of said joint length variations during an interval intermediate each said joint variation and said following restoration, said indication producing means including at least one translatable member mounted for translation relative to said elements in the direction of said lengthwise succession, and means coupled to said control means and said translatable member for operating said translatable member into and out of engagement with said elements from a predetermined disengaged position during said intermediate interval.

17. A device according to claim 16 including means coupled to said last mentioned means for producing an output indication representative of the distance between said predetermined disengaged position and the position at which said element engagement occurs, during said intermediate interval.

18. A calculating device comprising a set of similarly variable elements, means coupled to each said element for independently varying said element in relation to the other elements in said set along a line common to all of said elements, means for jointly controlling said means for varying to sequentially provide a selectively determined combination of joint variations of said elements along said common line followed by a joint restoration of said varied elements to reference idle positions thereof, first means coupled to said means for varying and said means for jointly controlling for producing indications representative of the said combinations of joint variations during an associated first time interval intermediate said joint variation and said following joint restoration, and second means coupled to said means for jointly controlling for producing an indication representative of the aggregate magnitude of said combination of joint variations along said common line during an associated second time interval intermediate said joint variation and said following restoration.

19. A device according to claim 18 wherein said associated second time interval precedes said associated first time interval.

20. A calculating device comprising a set of similarly variable elements, means coupled to each said element for independently varying said element in relation to the other elements in said set along a line common to all of said elements, means for jointly controlling said means for varying to provide, in sequence, a combination of selectively determined discrete variations of said elements along said common line followed by a joint restoration of said elements to reference idle states thereof, first means coupled to said means for varying and said means for jointly controlling for producing a digital record of said discrete variations during an associated first time interval intermediate said combination of variations and said joint restorations, and second means coupled to said means for jointly controlling for producing a check digit indication corresponding to the sum of the magnitudes of said discrete variations of said elements along said common line during an associated second time interval intermediate said combined variation and said first time interval.

21. A calculating device comprising a common shaft, a set of similarly variable elements mounted for lengthwise variation along said common shaft, means coupled to each said element for varying said element in relation to the other elements in said set, means for jointly controlling said means for varying to provide, in sequence, a combination of selectively determined discrete variations of said elements followed by a joint restoration of said elements to reference idle states thereof, first means coupled to said means for varying and said means for jointly controlling for producing a digital record of said discrete variations during an associated first time interval intermediate each said combination of variations and said following joint restoration, and second means coupled to said means for jointly controlling for producing a check digit indication corresponding to the aggregate of the magnitudes of said discrete variations of said elements during an associated second time interval intermediate said combined variation and said first time interval.

22. A device according to claim 21 wherein each element of said set comprises a pair of spirally meshed nut and screw members at least one of which is free to rotate with respect to the said shaft.

23. A device according to claim 21 wherein each said means for varying is coupled to at least one member of said pair of members of said associated element through a coupling connection which permits said coupled member to freely translate parallel to said shaft, through which connection said coupled member is rotated with respect to said shaft during operation of said means for varying.

24. A calculating device comprising a lengthwise succession of variable length elements mounted for independent relative translation along a line common to all of said elements, means coupled to said elements for producing, in sequence, a joint combination of selectively determined variations in the lengths of said elements along said common line followed by a joint restoration of the said element lengths to predetermined idle reference length conditions, and means coupled to said last mentioned means for producing an indication representative of the sum of said length variations along said common line during a predetermined time interval intermediate the said joint variation and the said restoration thereof.

25. A calculating device comprising a succession of variable length elements mounted for relative translation, control means coupled to said elements for producing, in sequence, a joint combination of selectively determined variations in the successive lengths of said elements followed by a joint restoration of all of the said elements to idle reference length conditions thereof, first means coupled to said control means for producing a reference check symbol indication, second means coupled to said elements for deriving a check symbol indication representative of the aggregate of said length variations during a first predetermined time interval intermediate each said combined variation and joint restoration, and means coupled to said control means and to said first and second means for comparing said reference and derived check symbol indications to determine the respective accuracy of each said selective determination of said joint combination of variations during said first predetermined time interval.

26. A device according to claim 25 including means coupled to said control means and said second means for recording a representation of said derived aggregate length indication during a second predetermined time interval intermediate said first predetermined interval and said associated joint restoration.

27. A device according to claim 26 wherein said comparing means includes electrical circuit means operated only during said first predetermined time interval to render said control and recording means inoperative if said compared reference and derived indications differ.

28. A device according to claim 27 including means associated in parallel circuit with said electrical circuit means for rendering said control means operative to complete said joint restoration while maintaining said recording means in an inoperative condition during said ensuing second predetermined interval.

29. A calculating device comprising a shaft, a first plurality of screw members mounted for translation parallel to said shaft, a first plurality of nut members spirally mated in a first succession of pairs with said first plurality of screw members, means adapting said pairs to be placed in end-to-end abutting relation parallel to said shaft with the nut member of each said pair abutting the screw member of said adjacent pair, means coupled to each said pair of spirally mated members of said first succession of pairs for producing a relative rotation between the members of said pair to vary the lateral extent of said pair, first means for measuring the aggregate extent of said first succession, a second shaft, a second plurality of screw members mounted for translation parallel to said shaft, a second plurality of nut members spirally mated in a second succession of pairs with said second plurality of screw members, means adapting said pairs of said second succession to be placed in end-to-end abutting relation parallel to said shaft with said nut member of each said pair abutting said screw member of said adjacent pair, means coupled to each said pair of spirally mated members of said second succession for producing a relative rotation between the members of said pair to vary the lateral extent of said pair, second means for measuring the aggregate extent of said second succession, means coactive with said means for producing relative rotations between members of said first and second successions of pairs for discretely determining said rotations in accordance with the digits of a number, with successive ones of said digits applied alternately to successive members of said first and second successions, means for independently registering first and second discrete displacements corresponding to check digits associated with said number, first comparing means for comparing said first registered displacement to the output of said first measuring means, second comparing means for comparing said second registered displacement to the output of said second measuring means, utilization means coupled to said means for producing relative rotations between members of said first and second successions for utilizing the variations thereof, control means for selectively rendering said utilization means operative in accordance with the simultaneous outputs of both said first and second comparing means, and means coupled to said first and second measuring means for selectively transferring the outputs thereof, as newly derived check digits.

30. In a cyclically operated accounting machine system having first and second groups of selecting elements for selecting numerical indications, electromechanical calculating means, means for sequentially controlling the operations of said calculating means and said first and second groups of elements, means coupled to the control and calculating means for conditioning the second group of selecting elements in accordance with calculated totals of numerical indications previously selected by said first group of elements, and first recording means coupled to said first and second groups, and to said control means for recording permanent representations of selected ones of said selected indications and said calculated totals thereof, the improvement comprising third and fourth groups of elements for representting associated numerical indications, means operative in association with said control means and a selected one of said first and second groups of elements for varying said third group of elements in accordance with a given function of the digits of the numerical indication of said selected group of elements, second recording means coupled to said control and said third means for selectively transferring a permanent check character indication to a selected document, means for selectively varying said fourth means in accordance with a previously determined check symbol, comparing means for comparing indications of said third and fourth groups of elements after the said variations thereof, means coupled to said control and comparing means for rendering said control means inoperative in conjunction with said comparison if said compared indications are in disagreement, and means coupled to said control means for manually reactivating said control means following said comparison.

31. In a cyclically operated calculating machine, a system for producing mechanical indications representative of check symbols associated with dynamic numerical displacement representations in said machine comprising first, second and third means coupled to the controls of said machine for deriving representations of respective first, second and third check symbols, said first and second means operating in association with alternate ones of the digit displacements in said numerical representation, and said third means operating in association with the most significant one of said digit selections displacements to provide a check symbol representative of the length of said selection.

32. In a numerical registering device including means for manually indexing a representation of a digital quantity and associated means for dynamically translating said indexed representation, a mechanism for deriving and verifying a check symbol relating to the digit length of said quantity, said mechanism comprising a first displaceable member, a plurality of elements coupled to said first member and operative in association with said translating means to limit displacements of said displaceable member in accordance with the tens complement of the order of the most significant digit translated by said translating means, means for displacing said displaceable member in accordance with said limit conditions of said elements in predetermined time relation to the operation of said translating means, and means coupled to said displaceable member for signalling the extent of the displacement thereof.

33. A mechanism in accordance with claim 32, wherein said signalling means comprises a digit printing unit.

34. A device in accordance with claim 32 wherein said means for displacing includes a rack displaced in association with said translating means, and said signalling means includes a switch mounted on said rack having an actuating arm shaped in the form of a cam, said actuating arm being operative to effect closure of the contacts of said switch when said rack is in a predetermined position, said predetermined position being determined in accordance with a previously determined check symbol representation entered into said means for manually indexing.

35. A calculator device comprising a lengthwise succession of variable length elements mounted for independent relative translation means coupled to said elements for producing in sequence a joint combination of selectively determined variations in the lengths of said elements in said succession followed by a joint restoration of said element lengths to predetermined idle reference length conditions, and means coupled to said last-mentioned means for producing an indication representative of the aggregate of said length variations during a predetermined time interval intermediate the said joint variation and restoration thereof, said indication producing means including a micrometer assembly enclosing said succession of elements, which is operated during said intermediate interval under the control of producing in said sequence, from a first position in which said elements are free to undergo a given maximum expansion in length to a second position in which all of said elements are combined in end-to-end abutting relation.

References Cited by the Examiner
UNITED STATES PATENTS

| | | | |
|---|---|---|---|
| 1,838,647 | 12/31 | Watters et al. | 235—61 |
| 1,886,148 | 11/32 | Baumann et al. | 235—61 |
| 2,481,648 | 9/49 | Dehn | 235—61 |
| 2,857,100 | 10/58 | Franck et al. | 235—153 |
| 2,886,239 | 5/59 | Reumerman et al. | 235—153 |
| 2,886,240 | 5/59 | Linsman | 235—153 |
| 2,950,048 | 8/60 | Luhn | 235—61 |
| 3,105,636 | 10/63 | Greene | 235—60.25 |

LEO SMILOW, *Primary Examiner.*